(12) United States Patent
Katsumata et al.

(10) Patent No.: US 6,301,591 B2
(45) Date of Patent: *Oct. 9, 2001

(54) APPARATUS AND METHOD FOR PROCESSING VARIOUS FORM DOCUMENTS TO MEET RESPECTIVE FORM, AND RECORDING MEDIUM STORING A PROGRAM TO EXECUTE THE PROCESS

(75) Inventors: Yutaka Katsumata; Takayuki Matsui, both of Kawasaki; Kazutoshi Yamoto, Akita; Masaki Hirata, Akita; Kazumi Yamaoka, Akita; Ryoei Asano, Akita, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/048,998

(22) Filed: Mar. 27, 1998

(30) Foreign Application Priority Data

Oct. 3, 1997 (JP) ...................................................... 9-271802

(51) Int. Cl.⁷ .............................. G06F 15/00; G06F 17/00
(52) U.S. Cl. ............................................ 707/505; 707/500
(58) Field of Search ..................................... 707/500–515, 707/517–530; 345/342–352, 507, 214, 55

(56) References Cited

U.S. PATENT DOCUMENTS

| | | | | |
|---|---|---|---|---|
| 5,144,693 | * | 9/1992 | Morgan | 707/505 |
| 5,208,907 | * | 5/1993 | Shelton et al. | 707/505 |
| 5,704,029 | * | 12/1997 | Wright, Jr. | 707/505 |
| 5,933,634 | * | 8/1999 | Enokido et al. | 395/701 |

* cited by examiner

*Primary Examiner*—Hosain T. Alam
*Assistant Examiner*—Alford W. Kindred
(74) *Attorney, Agent, or Firm*—Arent Fox Kintner Plotkin & Kahn, PLLC

(57) ABSTRACT

There is disclosed a form document processing apparatus for entry of data described in form documents. The form document processing apparatus includes a main processing section for performing predetermined processing operations for entered form data, and an auxiliary processing section which, upon receipt of a request from the main processing section, performs, in an auxiliary manner, among the processing operations to be performed by the main processing section, a specific processing operation determined by the contents of form data. Therefore, specific processing operations determined by the contents of form data can be performed without a need to develop a program for each type of task.

14 Claims, 23 Drawing Sheets

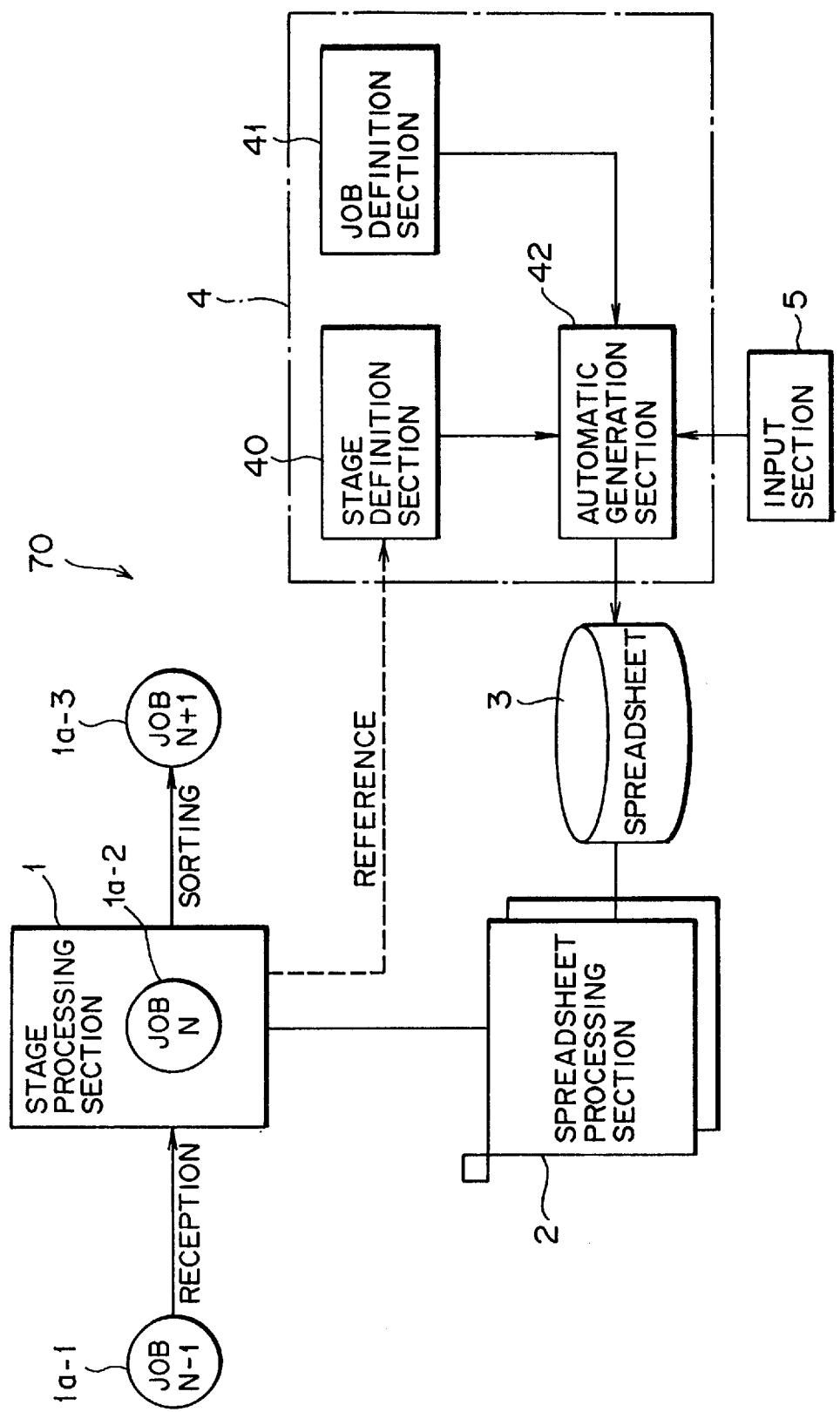

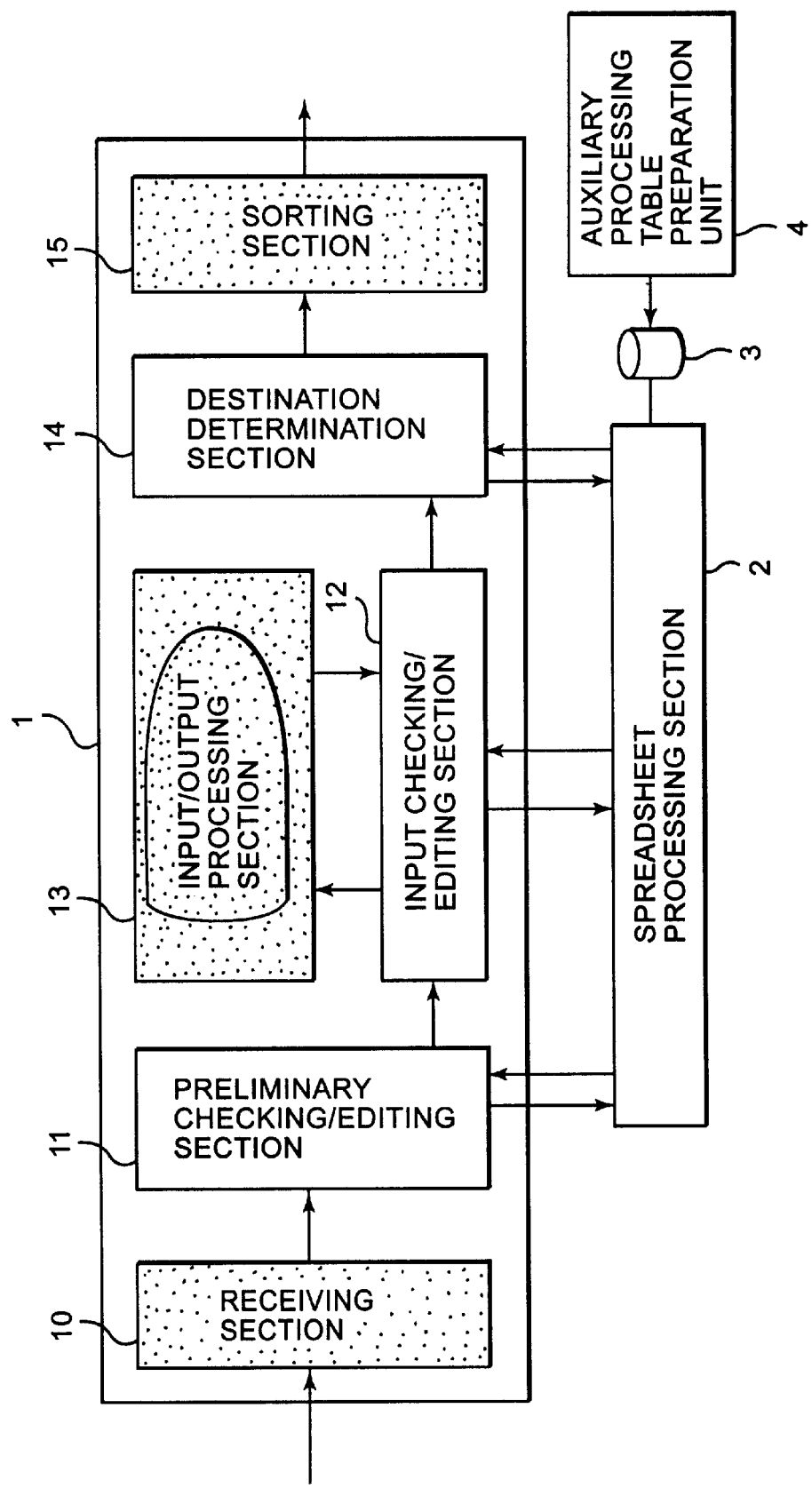

FIG.3

| NAME OF RECIPIENT COMPANY | FUJISTU SHINPAN CO. | FINANCIAL INSTITUTION CODE | | | |
|---|---|---|---|---|---|
| DESIGNATED ACCOUNT PRIVATE FINANCIAL INSTITUTION | NAME | FUJISTU | 1.BANK 3.COOPERATIVE BANK 5.FISHERMAN'S COOPERATIVE 2.SHINKIN BANK 4.AGRICULTURAL 6.LABOR CREDIT COOPERATIVE ASSOCIATION | | 1 |
| | NAME OF BRANCH | TAMA-SAKURAGAOKA | TO | 1.HEAD OFFICE 2.BRANCH OFFICE 3.LOCAL OFFICE | 2 |
| | 1. ORDINARY 2. CHECKING | 1 | ACCOUNT NO. | 1474989 | |
| POST OFFICE | ITEM CODE | CONTRACT-TYPE CODE | PASSBOOK CODE | PASSBOOK NUMBER | |
| | 246 | 16 | 12901 | 987 65432 | |
| | ACCOUNT NO. OF RECIPIENT | TOKYO 1-34567 | NAME OF RECIPIENT | FUJITSU SHINPAN CO. | |
| | | | MATSUI TAKAYUKI | | |

SEAL — CHECKING OF SEAL
FOR USE BY FINANCIAL INSTITUTION

SEAL OF RECEIVED POST OFFICE (MATSUI)

(MATSUI)

RECOGNIZED DATA

| 16 |
| 12901 |
| 987 65432 |
| MATSUI ?KAYUKI |

ENTRY NAME:
CONTRACT-TYPE CODE
PASSBOOK CODE
PASSBOOK NUMBER
HOLDER OF ACCOUNT

EDIT | SWITCH
STATUS | CLEAR

CORRECT REJECTED CHARACTERS
REQUEST FORM FOR ACCOUNT TRANSFER
NAME OF FORM: DOCUMENT REQUEST FORM FOR ACCOUNT TRANSFER

FIG. 4

REQUEST FORM FOR ACCOUNT TRANSFER
CORRECT REJECTED CHARACTERS ← E

1. CUSTOMER NO.: 987-654-321 / 987-654-321

2. PRIVATE FINANCIAL INSTITUTION:
   - FUJITSU / FUJITSU / 1 / BANK
   - 1474989 / 1474989
   - ORDINARY / 1
   - TAMA-SAKURAGAOKA / TAMA-SAKURAGAOKA / 2 / BRANCH OFFICE
   - 246 / 246 / 16 / 16 / 12901 / 12901 / 9876543 2 ← A / 9876543 2 ← B

3. POST OFFICE

4. HOLDER OF ACCOUNT: MATSUI TAKAYUKI / MATSUI ?KAYUKI / MATSUI TAKAYUKI ← C
   (MATSUI) (MATSUI)

EDIT | STATUS | CLEAR

| TYPE OF JOB | CATEGORY | SPREADSHEET PROCESSING | |
|---|---|---|---|
| JOB A | PRELIMINARY | SHEET A-P | |
| | INPUT | SHEET A-M | |
| | DESTINATION | SHEET A-E | |
| JOB B | PRELIMINARY | SHEET B-P | |
| | INPUT | SHEET B-M | E |
| | DESTINATION | SHEET B-E | |
| JOB C | PRELIMINARY | SHEET C-P | |
| | INPUT | SHEET C-M | |
| | DESTINATION | SHEET C-E | |

D

40A : STAGE TABLE

FIG. 7

40B: STAGE DEFINITION INFORMATION TABLE

| STAGE DEFINITION INFORMATION | |
|---|---|
| TITLE | α |
| CATEGORY | SCREEN |
| JOB TO BE PROCESSED | A, B, C |
| SHEET | SHEET A-P ⋮ |
| DESTINATION INFORMATION | I, II, III |
| | |

41A: JOB TABLE

| JOB TYPE | ENTRY DEFINITION |
|---|---|
| JOB A | ENTRY X<br>ENTRY Y ← 41a<br>ENTRY Z |
| JOB B | ENTRY S<br>ENTRY T ← 41b<br>ENTRY U |
| JOB C | ENTRY P<br>ENTRY Q ← 41c<br>ENTRY R |
| JOB D | ENTRY L<br>ENTRY M ← 41d<br>ENTRY N |

30: PRELIMINARY CHECKING/EDITING SPREADSHEET

| ENTRY NAME | PAGE | INPUT | | OUTPUT | | | | | CONVERSION TO NUMERICAL DATA | | | CONVERSION TO CHARACTER DATA | |
|---|---|---|---|---|---|---|---|---|---|---|---|---|---|
| | | INPUT | INPUT | OUTPUT | SCREEN EDIT | CHECK | MESSAGE | REJECT | VALUE CHECK | DE-FAULT | NOR-MALI-ZATION | SCREEN EDIT | INTEGRATED CHECK |
| YEAR | | 97 | | =IF(IS ERROR (N96), C96, N96) | =IF(IS ERROR (O96), D96, O96) | =AND(I96: J96) | =IF(I96=FALSE(), "CORRECT REJECTED CHARACTERS", "CORRECT THE VALUE DESIGNATED FOR YEAR") | =IS ERROR (SEARCH ("?", C96)) | =NOT (IS ERROR (N96)) | =YEAR (NOW()) | =IF(IS BLANK(C 96),E96, VALUE (C96)) | =YEAR (DATA (L96,1,1)) | =JIS(TE XT(DATE (L96,1,1), "ggge YEAR")) |
| MONTH | | 6 | | =IF(IS ERROR (N97), C97, N97) | =IF(IS ERROR (O97), D97, O97) | =AND(I97: J97) | =IF(I97=FALSE(), "CORRECT REJECTED CHARACTERS", "CORRECT THE VALUE DESIGNATED FOR MONTH") | =IS ERROR (SEARCH ("?", C97)) | =AND(NO T(ISERR OR(N97)), 0<L97, L97<13) | =MONTH (NOW()) | =IF(IS BLANK(C 97),K97, VALUE (C97)) | =L97 | =TEXT(N 102,"0") | =CONCA TE NATE (JIS(N97), "MONTH") |
| DAY | | 31 | | =IF(IS ERROR (N98), C98, N98) | =IF(IS ERROR (O98), D98, O98) | =AND(I98: J98) | =IF(I98=FALSE(), "CORRECT REJECTED CHARACTERS", "CORRECT THE VALUE DESIGNATED FOR DAY") | =IS ERROR (SEARCH ("?", C98)) | =AND(NO T(ISERR OR(N98)), NOT(IS ERROR( Q98))) | =DAY(NO W()) | =IF(IS BLANK(C 98),K98, VALUE (C98)) | =L98 | =TEXT(M 103,"0") | =CONCA TE NATE (JIS(N98), "DAY") =CONCATE = DATE VAL NATE(N96 UE(P98) "/", N97, "/", N98) |

FIG.9(b)

| ENTRY NAME | PAGE | INPUT | | OUTPUT | | | | | CONVERSION TO NUMERICAL DATA | | | CONVERSION TO CHARACTER DATA | |
|---|---|---|---|---|---|---|---|---|---|---|---|---|---|
| | | INPUT | INPUT | OUTPUT | SCREEN EDIT | CHECK | MESSAGE | REJECT | VALUE CHECK | DE-FAULT | NOR-MALI-ZATION | SCREEN EDIT | INTEGRATED CHECK |
| YEAR | | 97 | | 1997 | YEAR: HEISEI 9 | TRUE | CORRECT VALUE FOR YEAR | TRUE | TRUE | 1997 | 97 | 1997 | 1997 |
| MONTH | | 6 | | 6 | MONTH: 6 | TRUE | CORRECT VALUE FOR MONTH | TRUE | TRUE | 8 | 6 | 6 | 6 |
| DAY | | 31 | | 31 | DAY: 31 | FALSE | CORRECT VALUE FOR DAY | TRUE | FALSE | 4 | 31 | 31 | 31 1997/6/3 IVALUE 11 |

FIG. 11(a)

31: INPUT CHECKING/EDITING SPREADSHEET

| PRESSED KEY | ENTER | TERMINATION CONDITION | =IF(ISERROR(U17 0),FALSE(),J170) | | | | | | | | | |
|---|---|---|---|---|---|---|---|---|---|---|---|---|
| CURRENT PAGE | 1 | | | | | | | | | | | |

| | | | OUTPUT | | | | TERMINATION CONDITION EXPRESSION | | CONVERSION TO NUMERICAL DATA | | | CONVERSION TO CHARACTER DATA | | |
| ENTRY NAME | PAGE | INPUT | OUTPUT | SCREEN EDIT | CHECK | MESSAGE | KEY SEARCH | VALUE CHECK | PRESSED KEY | ENTER | Esc | PguP | PgDwn | Home | HOLD |
| | | | | | | | | | | | | | | | |
| | | | | | | | =HLOOKUP(C169, M169:R170,2) | REJECT | DE-FAULT | =TRUE() | NOR-MALI-ZATION | | SCREEN EDIT | INTEGRATED CHECK | |
| YEAR | 1 '97 | | =IF(IS ERROR (O173), D173, O173) | =IF(IS ERROR (P173), E173, P173) | =AND (J173: K173) | =IF(J173=FALSE (), "CORRECT REJECTED CHARACTERS", "CORRECT THE VALUE DESIGNATED FOR YEAR") | =IS ERROR (SEARCH ("~?", D173)) | =NOT(IS ERROR (O173)) | =YEAR (NOW()) | =IF(IS ELANK(D173),L173,VALUE (D173)) | =YEAR (DATE (M173,1,1)) | =TEXT (N173, "O") | =JIS(TEXT(DATE(M173,1,1),"ggge") | =AND(G173:G175) | =AND(G173:G175) | =AND(G173:G175) | =TRUE() |
| MONTH | 1 6 | | =IF(IS ERROR (O174), D174, O174) | =IF(IS ERROR (P174), E174, P174) | =AND (J174: K174) | =IF(J174=FALSE(), "CORRECT REJECTED CHARACTERS", "CORRECT THE VALUE DESIGNATED FOR MONTH") | =IS ERROR (SEARCH ("~?", D174)) | =AND(NOT(ISERROR(O174)),O=M174,M174<13) | =MONTH (NOW()) | =IF(IS ELANK(D174),L174,VALUE (D174)) | =M174 | =TEXT (N174, "O") | =CONCATE NATE (JIS (O17)) | | | |
| DAY | 1 31 | | =IF(IS ERROR (O175), D175, O175) | =IF(IS ERROR (P175), E175, P175) | =AND (J175: K175) | =IF(J175=FALSE(), "CORRECT REJECTED CHARACTERS", "CORRECT THE VALUE DESIGNATED FOR DAY") | =IS ERROR (SEARCH ("~?", D175)) | =AND(NOT(ISERROR(O175),NOT(ISERROR(R175))) | =DAY (NOW()) | =IF(IS ELANK(D175),L175,VALUE (D175)) | =M175 | =TEXT (N175, "O") | =CONCATE NATE (JIS (O17)) | =CONCATE = DATE VALNATE(O17 UE (Q175) 3,","01 74,","01 75) | | |

FIG.12(a)

32: DESTINATION DETERMINATION SPREADSHEET

| PRESSED KEY | ENTER | DESTINATION KEY |
|---|---|---|
| ENTER | | =IF(ISERROR(J222),"CANCEL",J222) |
| | | =IF(ISER ROR(J222),"CANCEL",J222) |

TERMINATION CONDITION EXPRESSION

| | KEY SEARCH | PRESSED KEY | ENTER | Esc | HOLD | |
|---|---|---|---|---|---|---|
| | =HLOOKUP(C221,M221:O22,2) | | =IF(M228>3000, | CANCEL HOLD | | "RECOGNITION BY GENERAL AFFAIRS DEPT" "SIMPLIFIED RECOGNITION" |
| | | DEFAULT | | NORMALIZATION | | CONVERSION TO NUMERICAL DATA |
| | | | | | | CONVERSION TO CHARACTER DATA |
| | | =YEAR(NOW()) | =IF(ISBLANK(D225),L225,VALUE(D225)) | =YEAR(DATE(M225,1,1)) | =TEXT(N225,"O") | |
| | | =MONTH(NOW()) | =IF(ISBLANK(D226),L226,VALUE(D226)) | =M226 | =TEXT(N226,"O") | |
| | | =DAY(NOW()) | =IF(ISBLANK(D227),L227,VALUE(D227)) | =M227 | =TEXT(N227,"O") | |
| | | 0 | =IF(ISBLANK(D228),L228,VALUE(D228)) | =M228 | =TEXT(N228,"O") | |

| ENTRY NAME | PAGE | INPUT INPUT | OUTPUT |
|---|---|---|---|
| YEAR | 1 | '97 | =IF(ISERROR(O225),D225,O225) |
| MONTH | 1 | 6 | =IF(ISERROR(O226),D226,O226) |
| DAY | 1 | 31 | =IF(ISERROR(O227),D227,O227) |
| MONETARY AMOUNT | 1 | 10000 | =IF(ISERROR(O228),D228,O228) |

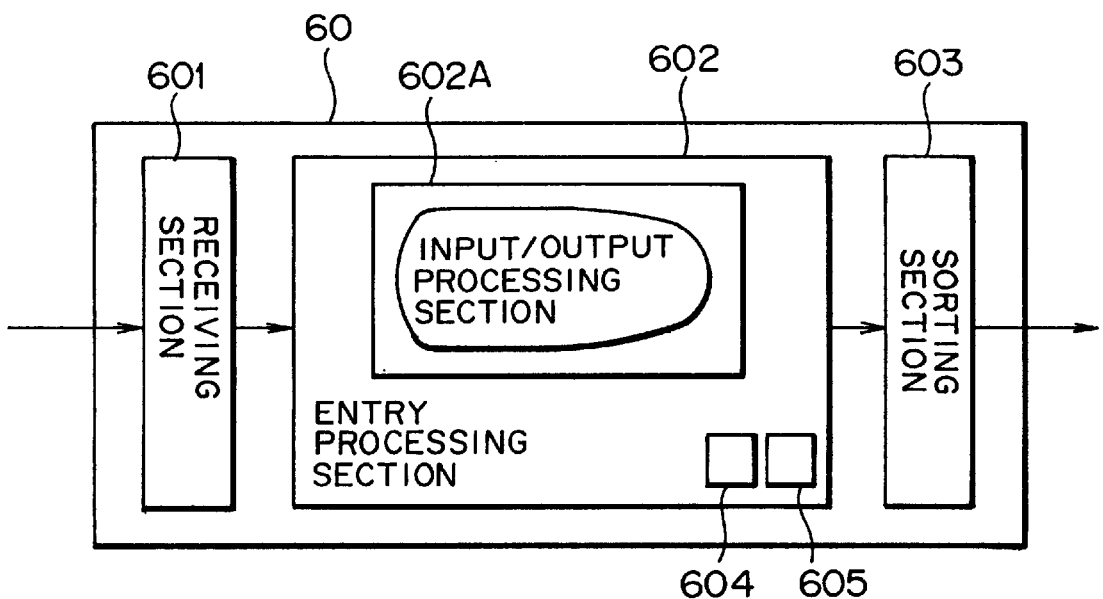

US 6,301,591 B2

APPARATUS AND METHOD FOR PROCESSING VARIOUS FORM DOCUMENTS TO MEET RESPECTIVE FORM, AND RECORDING MEDIUM STORING A PROGRAM TO EXECUTE THE PROCESS

BACKGROUND OF THE INVENTION (1). Field of the Invention

The present invention relates to a technique for entering various types of data (i.e. for the purposes of registration, input, or the like), and more particularly, to an apparatus and method for processing form documents by which data printed on form document are entered, as well as to a computer readable recording medium having form document processing program recorded thereon.

(2). Description of the Related Art

An entry system used for entering various types of received data usually processes received data in a predetermined sequence. Such an entry system is employed by, e.g., a financial institution.

FIG. 21 shows the configuration of a typical entry system. An entry system 100 shown in FIG. 21 comprises one or more entry terminals (e.g., workstations for business use which are installed in a branch office and will be hereinafter abbreviated as "WS") 50A, 50B and an unillustrated host computer (e.g., an unillustrated server which is also installed in the branch office).

The entry terminals 50A, 50B check the contents of the data written on form document to be entered and display the contents on a screen. The operator makes a correction to (or edition) the data, and the entry terminal checks the results of correction. Subsequently, according to the contents of the data, the data are transmitted to predetermined destinations, such as those which will be described later. For example, as shown in FIG. 21, the entry terminal 50A comprises a display 51a, a computer body 52a; and an input device 53a, and the entry terminal 50B comprises a display 51b, a computer body 52b, and an input device 53b.

Upon receipt of form data, the entry terminals 50A, 50B display the received form data, respectively, on the displays 51a, 51b via the computers 52a, 52b. The data are subjected to given processing through use of the input devices 53a, 53b.

Upon receipt of form data from the entry terminals 50A, 50B via an information transmission line 50C, the host computer transmits the thus-received form data to another entry terminal (not shown). Even the host computer is designed so as to be capable of performing the same processing as that performed by the entry terminals 50A, 50B.

More specifically, as shown in FIG. 22(a), each of the foregoing entry terminals 50A, 50B is made up of, e.g., a stage processing section 60 comprising a receiving section 601, an entry processing section 602, and a sorting section 603. The stage processing section 60 performs given processing (e.g., checking for erroneous data, data edition, determination of destinations, or the like) according to the contents of the received form data (or the data which are written on form document and are to be entered) and sorts out form data according to corresponding destinations.

In short, by virtue of the stage processing section 60, the foregoing entry terminals 50A, 50B can process the received form data in a given manner.

The receiving section 601 is designed so as to receive entered form data; more specifically, image data resulting from reading form data and recognized character information resulting from recognition of characters from the image data or data manually entered by the operator.

On the basis of given conditions, the entry processing section 602 subjects form data received from the receiving section 601 to several processing operations, such as checking for erroneous data, data edition (data correction), or determination of a destination of the post-edited form data. To this end, the entry processing section 602 has an input/output processing section 602A and check tables 604 and 605.

The input/output processing section 602A is used for displaying on the screen form data received from the receiving section 601 and for performing checking, editing, and sorting operations under the conditions set in the check tables 604, 605, which will be described later. The input/output processing section 602A corresponds to the foregoing displays 51a, 51b and the input devices 53a, 53b (see FIG. 21).

The check table 604 (see FIG. 22(b)) is a table used for determining whether or not the data themselves include errors, and the check table 605 (see FIG. 22(c)) is a table used for determining a destination for the data. The determination of the destination is made by the check table 605 according to the type of form document, a monetary amount, or the contents of form data.

In other words, the entry processing section 602 is designed so as to display on the screen form data received from the receiving section 601 by means of the input/output processing section 602A, as well as to check on the basis of the check table 604 whether or not the contents of form data are correct.

The data errors detected by the foregoing check table 604 are originated in the matter entered in form document. If the matter correctly entered in the form document is recognized as an error, the operator detects this matter by reference to the image data of the form document. In this way, two ways of detecting data errors are provided.

The editing operation performed by the entry processing section 602 is accomplished by the operator making a correction to the data errors detected by the aforementioned two ways.

In a financial facility, jobs must be sorted into those which may be performed by a clerk at a teller's window on his own authority and into those which require the approval of another clerk (e.g., a service clerk or a branch manager) according to the type of form document or the monetary amount to be handled. To this end, the entry processing section 602 is designed so as to automatically determine the destination of the corrected form data (or the category into which the corrected form data are sorted) on the basis of the foregoing check table 605 (i.e., according to the contents of form data, e.g., the type of form document or a monetary amount).

Further, the sorting section 603 transmits form data processed by the entry processing section 602 to the destination determined by the entry processing section 602.

Since the foregoing entry terminals 50A, 50B are connected together via the host computer, the stage processing sections 60 provided, respectively, for the entry terminals 50A, 50B are capable of exchanging form data with each other. Still more, form data can be sent to and received from the entry terminals 50A, 50B without intervention of the host computer.

With the foregoing configuration, when the foregoing entry system 100 receives form data, the entry terminals 50A, 50B subject the thus-received form data to checking, editing, and destination-determination operations upon reference to the check tables 604 and 605. Subsequently, the thus-processed form data are transmitted to desired destinations through the medium of the information transmission line 50C and the host computer.

Accordingly, the foregoing entry system 100 enables a round of entry tasks to be processed in orderly sequence and in tandem with each other, on the basis of the check tables 604, 605 imparted with a degree of freedom for each task.

However, in the foregoing entry system 100, the processing operations performed by the entry processing section 602—that is, the checking for the data entered in a received form (e.g., dates, monetary amounts, and account numbers in a case where entry task is performed by a financial facility), the editing of form data, and the sorting of the post-edited form data—are very complicated. Further, the details of the processing vary among tasks (i.e., the processing operations have a high degree of task dependence), and therefore the existing data entry system suffers from the difficulty of setting in the check tables 604, 605 conditions other than the boundary conditions under which variations in a part of a program (e.g., a check editing logic) may be predicted beforehand.

More specifically, with regard to the foregoing entry system 100, a program used for constructing the entry system 100 for each type of task is developed. The details of the aforementioned processing operations may be set in the check tables 604, 605 together with a certain degree of freedom. However, the degree of freedom is limited to the range of variations in a task.

For this reason, in a case where the details of the processing operations beyond the range of variations in a task are set (e.g., in a case where the number of check items provided in the check tables 604, 605 is additionally increased), the check tables 604, 605 cannot address these settings by themselves, and hence the program itself must be changed, requiring immense labor and time and adding to the cost of the entry system.

The check tables 604, 605 may be incorporated into form document processing program in the form of logic. However, this results in complication of the program and an increase in the labor and cost, as well as in the consumption of much time.

SUMMARY OF THE INVENTION

The present invention has been contrived in view of the foregoing problems, and an object of the present invention is to provide a method of and apparatus for processing form documents, wherein a specific processing operation determined by the contents of form data can be performed without a need to develop a program for configuring an entry system for various task types.

Another object of the present invention is to provide a computer readable recording medium on which is recorded a form document processing program for causing a computer to act as a form document processing apparatus such as that mentioned previously.

To these ends, according to one aspect of the present invention, there is provided a form document processing apparatus comprising: a main processing section for performing a predetermined processing operation for entered form data; and an auxiliary processing section which, upon receipt of a request from the main processing section, performs, in an auxiliary manner, among the processing operations to be performed by the main processing section, a specific processing operation determined by the contents of form data.

Preferably, the form document processing apparatus has an auxiliary processing table having set therein the details of the specific processing operation which the auxiliary processing section is requested to process, and the auxiliary processing section performs the specific processing operation on the basis of the details set in the auxiliary processing table.

Preferably, in the form document processing apparatus, the auxiliary processing section performs the specific processing operation by spreadsheet processing, on the basis of the details set in the auxiliary processing table.

In the form document processing apparatus according to the present invention, among the processing operations to be performed on a set of received form data, the specific processing operation determined by the contents of form data is performed in an auxiliary manner, imparting the form document processing apparatus with a degree of freedom required for general-purpose applications. Since this eliminates the need to develop a program for the purpose of configuring an entry system for various task types, an entry system can be speedily configured with less labor and at lower cost.

More preferably, the form document processing apparatus according to the present invention further includes an auxiliary processing table preparation unit for the purpose of preparing the auxiliary processing table. The auxiliary processing table preparation unit comprises: a main processing definition section which stores the name of received form data and the name of an auxiliary processing table used when the set of form data is processed; a form data definition section which stores information about the name of form data and about entry items constituting the set of form data; and an auxiliary processing table preparation section which prepares an auxiliary processing table on the basis of the information stored in the main processing definition section and the form data definition section.

As mentioned previously, the form document processing apparatus according to the present invention further includes an auxiliary processing table preparation unit for the purpose of preparing the auxiliary processing table. The auxiliary processing table preparation unit comprises a main processing definition section, which stores the name of received form data and the name of an auxiliary processing table used when the set of form data is processed; a form data definition section, which stores information about the name of form data and about entry items constituting the set of form data; and an auxiliary processing table preparation section which prepares an auxiliary processing table on the basis of the information stored in the main processing definition section and the form data definition section. With this configuration, the form document processing apparatus according to the present invention has the advantage of being able to efficiently prepare an auxiliary processing table which is required by the specific processing operation defined by the contents of form data according to the details of the processing operation without the need for an operator to enter all the information necessary for the processing operations performed by the main processing section.

More preferably, the form document processing apparatus according to the present invention further includes an input section for inputting the details of the specific processing operation which the auxiliary processing section is requested to perform. The auxiliary processing table preparation section comprises: means for receiving the name of form data and the name of an auxiliary processing table from the main processing definition section; means which captures, on the basis of the name of form data, information about entry items constituting the set of form data in the form data definition section; means for entering the information about the entry items constituting the set of form data into corresponding areas of the auxiliary processing table specified by the name of the auxiliary processing table; and means for entering, in corresponding areas of the auxiliary processing table, the details of the specific processing operation which are received from the input section and which the auxiliary processing section is requested to perform.

As mentioned previously, the form document processing apparatus has the input section for inputting the details of the specific processing operation which the auxiliary processing section is requested to perform. Further, the form document processing apparatus has the means for entering, in corresponding areas of the auxiliary processing table, the details of the specific processing operation which are received from the input section and which the auxiliary processing section is requested to perform. With this configuration, the form document processing apparatus according to the present invention has the advantage of being able to allow the user himself to freely set the descriptions (or definitions) which are entered in the auxiliary processing table to be used for processing form documents, as well as being able to immediately reflect opinions of the user at the site of work.

More preferably, in the form document processing apparatus according to the present invention, the auxiliary processing table preparation unit—for preparing an auxiliary processing table having set therein the details of the specific processing operation which the auxiliary processing section is requested to perform—comprises a main processing definition section which stores the name of received form data and the name of an auxiliary processing table used when the set of form data is processed. The main processing section comprises: means for capturing the name of form data from the received set of form data; means which, by reference to the information stored in the main processing definition section, selects an auxiliary processing table specified by the name of an auxiliary processing table corresponding to the thus-extracted name of form data; and means which enters the received set of form data in corresponding areas of the thus-selected auxiliary processing table.

As mentioned previously, in the form document processing apparatus according to the present invention, among the processing operations which are performed on received form data, the specific processing operation determined by the contents of the set of form data are performed in an auxiliary manner, imparting the form document processing apparatus with a degree of freedom required for general-purpose applications. Since this eliminates the need to develop a program for the purpose of configuring an entry system for various task types, an entry system can be speedily configured with less labor and at lower cost.

More preferably, in the form document processing apparatus according to the present invention, the main processing definition section has a table for storing the names of a plurality of sets of form data and the names of auxiliary processing tables used in processing the plurality of sets of form data so as to correspond to one another, as well as for storing information about the destinations of the plurality of sets of form data that have undergone given processing in the main processing section.

As mentioned previously, in the form document processing apparatus according to the present invention, the main processing definition section has a table for storing the names of a plurality of sets of form data and the names of auxiliary processing tables used in processing the plurality of sets of form data so as to correspond to one another, as well as for storing information about the destinations of the plurality of sets of form data that have undergone given processing in the main processing section. With this table, the form document processing apparatus according to the present invention has the advantage of being able to speedily extract the auxiliary processing table corresponding to a set of form data to be processed.

Preferably, in the form document processing apparatus according to the present invention, the form data definition section has a table for storing information about entry items constituting a set of form data for each of the names of the plurality sets of form data.

As mentioned previously, in the form document processing apparatus according to the present invention, the form data definition section has a table for storing information about entry items constituting a set of form data for each of the names of the plurality sets of form data. This table enables information about corresponding entry items to be readily added or changed for each name of data form. Accordingly, the form document processing apparatus according to the present invention has the advantage of being able to accomplish increased flexibility in preparation of the auxiliary processing table in the auxiliary processing table preparation section.

According to another aspect of the present invention, there is provided a form document processing method for performing predetermined processing for entered form data, the method comprising the steps of: requesting an external section to perform, among the processing operations performed on the set of form data, a specific processing operation determined by the contents of the set of form data when the specific processing operation is performed; and performing the specific processing operation in an auxiliary manner upon receipt of the request issued in the requesting step.

Preferably, the form document processing method according to the present invention further includes an auxiliary processing table preparation step of preparing an auxiliary processing table having set therein the details of the specific processing operation requested to be performed in the auxiliary processing step. In the auxiliary processing step, the specific processing operation is performed on the basis of the details set in the auxiliary processing table prepared in the auxiliary processing table preparation step.

As mentioned previously, under the form document processing method according to the present invention, among the processing operations performed on the received form data, a specific processing operation determined by the contents of the set of form data is performed in an auxiliary manner, imparting the form document processing apparatus with a degree of freedom required for general-purpose applications. Since this eliminates the need to develop a program for the purpose of configuring an entry system for various task types, an entry system can be speedily configured with less labor and at lower cost.

According to still another aspect of the present invention, there is provided a computer-readable recording medium on which is recorded a form document processing program for performing predetermined processing for entered form data, wherein the form processing program causes the computer to execute: a procedure for requesting an external section to perform, among the processing performed on the received form data, a specific processing operation determined by the contents of the set of form data when the specific processing is performed, and an auxiliary processing procedure in which, upon receipt of a request issued in the request procedure, the external section performs the specific processing operation in an auxiliary manner.

More preferably, in the computer-readable recording medium having a form document processing program recorded thereon according to the present invention, the form document processing program causes the computer to execute: an auxiliary processing table preparation procedure for preparing an auxiliary processing table having set therein the details of the specific processing operation requested to be performed in the auxiliary processing procedure; and an auxiliary processing procedure for performing the specific processing operation on the basis of the details set in the auxiliary processing table prepared in the auxiliary processing table preparation procedure.

According to a still further aspect of the present invention, there is provided a computer-readable recording medium on which is recorded a form document processing program for performing predetermined processing for entered form data, wherein the form processing program causes the computer to execute: a procedure for sending the set of form data to the outside when there is performed, among the processing operations performed on the received form data, a specific processing operation determined by the contents of the set of form data, and a requesting procedure for requesting the external section to perform the specific processing operation for the set of form data transmitted in the transmission procedure.

According to the present invention, the computer-readable recording medium having a form document processing program recorded thereon is capable of performing form document processing operations through use of the recording medium. Therefore, there can be expected widespread use of an apparatus employing the form document processing method and apparatus according to the present invention.

BRIEF DESCRIPTION OF THE DRAWINGS

FIG. 1 is a block diagram diagrammatically showing the configuration of a form document processing apparatus according to an embodiment of the present invention;

FIG. 2 is a block diagram diagrammatically showing the configuration of the form document processing apparatus according to the embodiment of the present invention;

FIG. 3 is an illustration showing one example of information which can be read from a set of form data received by a stage processing section according to the embodiment of the present invention;

FIG. 4 is an illustration for explaining input checking/editing processing operations performed by the stage processing section according to the embodiment of the present invention;

FIG. 6 is an illustration for explaining a main processing definition section constituting an auxiliary processing table preparation unit according to the embodiment of the present invention;

FIG. 7 is a table for explaining the main processing definition section constituting the auxiliary processing table preparation unit according to the embodiment of the present invention;

FIG. 8 is a table for explaining a form document data definition section constituting the auxiliary processing table preparation unit according to the embodiment of the present invention;

FIGS. 9(a) and 9(b) are tables respectively showing one example of the auxiliary processing table used for a preliminary checking/editing operation according to the embodiment of the present invention;

FIGS. 11(a) and 11(b) are tables respectively showing one example of the auxiliary processing table used for the input checking/editing operation according to the embodiment of the present invention;

FIGS. 12(a) and 12(b) are tables respectively showing one example of the auxiliary processing table used for a destination determination operation according to the embodiment of the present invention;

FIGS. 22(a) to 22(c) are illustrations for respectively explaining the stage processing section of the general form document processing apparatus.

DESCRIPTION OF THE PREFERRED EMBODIMENT

Figure 5:
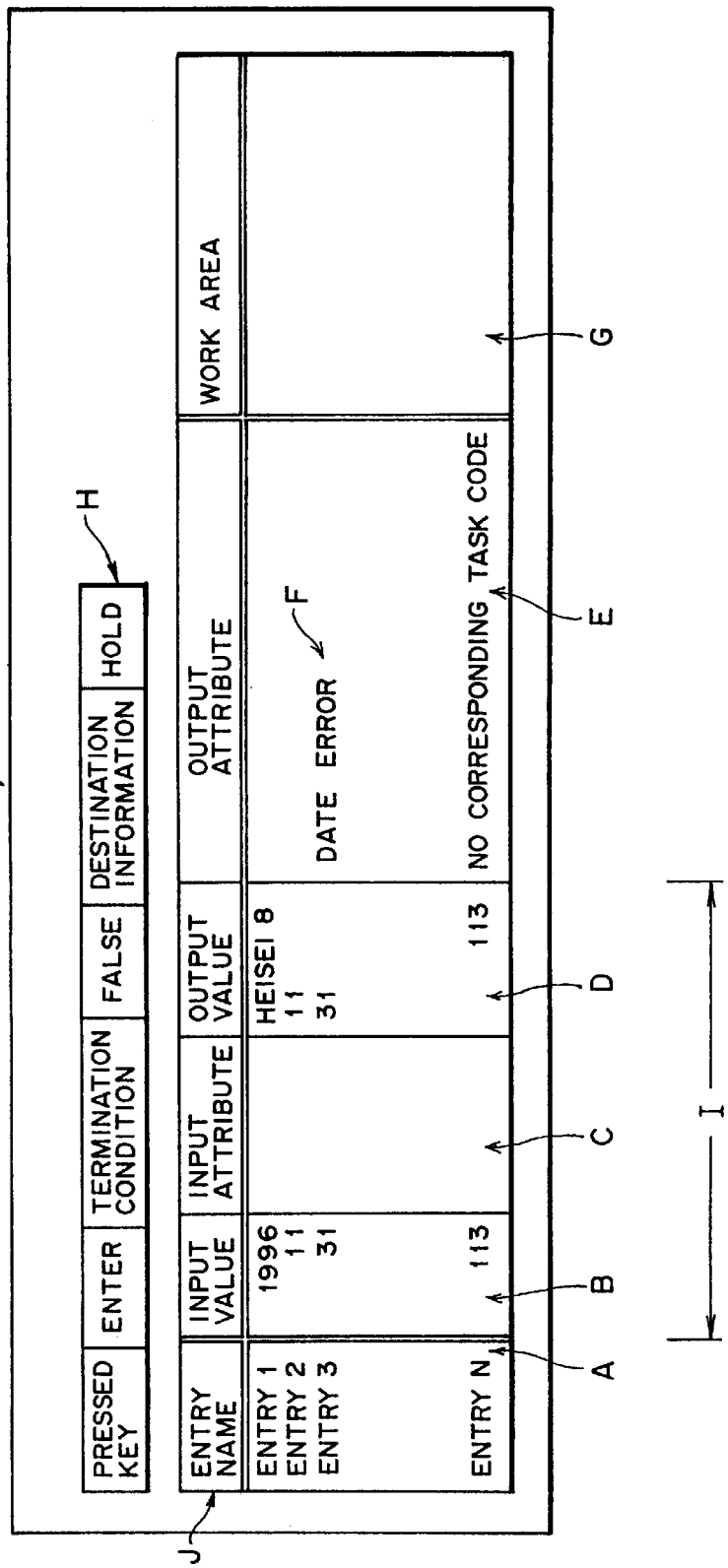
FIG. 5 is an illustration for explaining an auxiliary processing table according to the embodiment of the present invention.

An embodiment of the present invention will be described with reference to the drawings.

FIG. 1 is a block diagram showing the configuration of form document processing apparatus according to the embodiment of the present invention. A form document processing apparatus 70 shown in FIG. 1 checks the contents of the data written on form document to be entered and displays the data on a screen. The operator makes a correction to (or edits) the data, and the form document processing apparatus 70 checks the result of correction and distribute the data to a destination according to the contents thereof. For example, as shown in FIG. 1, the form document processing apparatus 70 is composed of a stage processing section 1, a spreadsheet processing section 2, and a spreadsheet 3, and an auxiliary processing table unit 4.

The form document processing apparatus 70 corresponds to the entry terminals 50A, 50B of the entry system 100, which has been described with reference to FIG. 21, and is used in a financial institute or the like in a similar manner to that of the entry terminals 50A, 50B.

The stage processing section 1 is a main section for performing checking processing, correcting processing, and destination determination processing in accordance with the contents of entered form data (hereinafter may be referred to as a "job"). The stage processing section 1 distributes the form data to the destination determined by the destination determination processing.

For example, reference numeral 1a-1 shown in FIG. 1 designates form data (job N−1) before being received by the stage processing section 1; reference numeral 1a-2 designates form data in process (job N); and reference numeral 1a-3 designates form data to be transmitted to a destination (job N+1) After having been transmitted to respective form document processing apparatus (not shown) at predetermined destinations in the sequence in which the sets of data are input to the stage processing section, these sets of form data 1a-1, 1a-2, and 1a-3 are processed by stage processing sections (not shown) of the form document processing apparatus provided at the destinations. The thus-processed sets of form data are further output to form document processing apparatus (not shown) provided at the next destinations.

In short, form data can be transmitted to a more suitable destination by means of a plurality of stages. In a case where there is no need to distinguish jobs from one another, as job N−1, job N, and job N+1 and where form data are generally referred to, form data will be referred to simply as "form data 1a."

As shown in FIG. 2, the stage processing section 1 comprises, e.g., a receiving section 10, a preliminary checking/editing section 11, an input checking/editing section 12, an input/output processing section 13, a destination determination section 14, and a sorting section 15. As a result of an entry terminal analogous to the entry terminals 50A, 50B shown in FIG. 21 being provided with the foregoing stage processing section 1, received form data are subjected to given processing.

Before form data are subjected to the processing by the foregoing sections, the stage processing section 1 is designed so as to recognize characters from the image data obtained as a result of a scanner (not shown) having scanned form document to be processed, thereby acquiring the type of form data 1a (i.e., a job type and a form data name) and the contents entered in form data 1a.

For example, as shown in FIG. 3, the stage processing section 1 is designed so as to read, from the read image data (indicated by arrow A shown in FIG. 3), the job type of the image data (not shown) and definition information corresponding to the job type [e.g., entry names, such as a contract-type code, a passbook code, a passbook number, and the holder of a bank account (see FIG. 3B)]. As a result, from the scanned image data, the contents of form data 1a corresponding to the definition information are automatically recognized as characters (see FIG. 3C).

Unrecognizable data are displayed so as to be distinguished from the other sets of data. More specifically, in the example shown in FIG. 3, since a part of the name "Matsui ?kayuki (indicated by arrow D)" is unidentifiable, the set of data is indicated (e.g., in color) so as to become distinguished from the other sets of data. Simultaneously with the indication of an unrecognizable set of data, an error message corresponding to the unrecognizable set of data appears on the screen [e.g., message "Correct a rejected character(s)" indicated by arrow E].

The receiving section 10 shown in FIG. 2 captures the contents of form data 1a before being subjected to processing operations performed by the foregoing stage processing section 1 (e.g., image data, information of recognized characters, and data manually entered by the operator) and the job type of form data.

The preliminary checking/editing section 11 determines whether or not the contents of form data 1a received from the receiving section 10 include errors. The preliminary checking/editing section 11 is designed such that upon receipt of the contents and job type of form data 1a from the receiving section 10, the preliminary checking/editing section 11 causes the spreadsheet processing section 2, which will be described later, to detect errors in the contents of form data 1a.

With regard to the errors in the contents of form data 1a, there are two types of errors; that is, an error originating in the contents themselves entered in form data 1a, and an error caused by the failure of the spreadsheet processing section to recognize the contents entered in form data 1a from the descriptions written on form data 1a (i.e., an error attributable to a recognition failure).

Even when the image data can be correctly recognized, if the item entered in the form document is incorrect [e.g., an impossible date (such as February 30) is entered in the form document or the total monetary amount is incorrect], form data 1a is detected as having an error.

In contrast, if the image data cannot be recognized, the unrecognizable set of data (name "Matsui ?kayuki" indicated by arrow D shown in FIG. 3) is detected so as to be distinguished from the other correctly-recognized image sets of data.

With regard to the aforementioned preliminary checking/editing operation, provided that form data 1a are entered in sequence, the next form data 1a may be processed through background processing while the current form data 1a are being processed. Alternatively, the next form data 1a may be processed immediately before being displayed on the screen by the input/output processing section 13, which will be described later.

The input/output processing section 13 displays on the screen the check result regarding form data 1a received from the preliminary checking/editing section 11 via the input checking/editing section 12, which will be described later. The input/output processing section 13 allows the input checking/editing section 12 to perform checking, editing, and sorting operation for form data 1a. The input/output processing section 13 corresponds to the aforementioned displays 51a, 51b and the input devices 53a, 53b (see FIG. 21).

More specifically, the input/output processing section 13 is designed so as to vertically arrange side by side to each other on the screen the data—which are obtained by reading the information actually written on the form document as image data—and the data recognized from the image data, in such a way as to permit comparison between the sets of data entry by entry. For example, as shown in FIG. 4, the image data of the information actually described in the form document can be displayed in an upper entry box (indicated by arrow A shown in FIG. 4), whereas the information recognized from the image data can be displayed in a lower entry box (indicated by arrow B).

A set of data including errors (i.e., a set of data including an error originating in the contents themselves entered in form data 1a, or a set of data which cannot be recognized from the contents of form data 1a) is displayed so as to be distinguished from the other sets of data.

The input checking/editing section 12 edits the contents of form data 1a received from the preliminary checking/editing section 11. More specifically, the result of checking for form data 1a performed by the preliminary checking/editing section 11 is displayed on the screen by means of the input/output processing section 13 (i.e., the displays 51a, 51b). Of the checking results displayed on the screen, the checking result from which an error is detected is corrected through use of the input/output processing section 13 (i.e., the input devices 53a, 53b).

In short, the input checking/editing section 12 corrects (re-edits) form data 1a whose contents themselves are incorrect, unrecognizable data, erroneously-recognized data resulting from improper recognition of the image data, all of which are detected by the preliminary checking/editing section 11.

For example, in the case of the screen shown in FIG. 4, a part of the Katakana (Japanese Characters) name actually entered in the entry "Nominal Person of Bank Account" cannot be recognized, and therefore the unrecognized name is displayed in color so as to be distinguished from the other sets of data (e.g., the unrecognized name is displayed in red and is indicated by arrow C shown in FIG. 4). The input checking/editing section 12 is adapted to correct the thus-colored portion. Even in this case, simultaneously with the indication of the unrecognized set of data, an error message corresponding to the unrecognized set of data appears on the screen (e.g., message "Correct a rejected character(s)" indicated by arrow E). The processing to be performed by the input checking/editing section 12 is executed by the spread sheet section 2, which will be described later.

The destination determination section 14 determines a given destination for form data 1a edited by the input checking/editing section 12. On the basis of a destination code number included in form data 1a, the destination of form data 1a is determined. In a financial facility, jobs are sorted into those which may be performed by an operator at his own authority and into those which require the approval of a clerk other than the operator according to the monetary amount or the like entered in form data 1a.

The destination determination processing performed by the destination determination section 14 is carried out by the spreadsheet processing section 2, which will be described later.

The sorting section 15 transmits form data 1a, which have undergone the processing, to the destination determined by the destination determination section 14.

The foregoing stage processing section 1 may be set according to the type of task, and hence entry tasks can be executed not only together with one stage but also in conjunction with a plurality of stages.

Next, upon receipt of a request from each processing section of the stage processing section 1 (the main processing sections: the preliminary checking/editing section 11, the input checking/editing section 12, and the destination determination section 14), the spreadsheet processing section (i.e., an auxiliary processing section) 2 shown in FIG. 1 performs in an auxiliary manner a specific processing operation (i.e., the processing operation determined by the contents of form data 1a) to be performed by the processing sections 11, 12, and 14 of the stage processing section 1. On the basis of the details of settings of a spreadsheet 3, which will be described later, the spreadsheet processing section 2 performs the specific processing operation through spreadsheet processing.

The details of the specific processing operation that the spreadsheet processing section 2 is requested to perform are set in the spreadsheet 3. This spreadsheet 3 is designed to act as an auxiliary processing table for the purpose of form document processing.

In short, the spreadsheet 3 is used by the spreadsheet processing section 2 depending on the details of the processing operations performed by the processing sections 11, 12, and 14 of the stage processing section 1. There are three types of spreadsheets: that is, a preliminary checking/editing spreadsheet corresponding to the processing of the preliminary checking/editing section 11; an input checking/editing spreadsheet corresponding to the input checking/editing section 12; and a destination determination spreadsheet corresponding to the processing of the destination determination section 14. More details about these spreadsheets will be described with reference to FIGS. 9, 11, and 12.

More specifically, as shown in FIG. 5, the spreadsheet 3 is a table containing information about "Entry Name," "Input Value," "Input Attribute," "Output Value," "Output Attribute," and "Work Area" set thereon. When input data corresponding to the "Entry Name" are set in the "Input Value" area (e.g., column or cell) of the spreadsheet 3 by means of the processing sections 11, 12, and 14 of the stage processing section 1, the foregoing spreadsheet processing section 2 performs processing according to the input data. The thus-processed data are displayed in the "Output Value" column.

When the processing sections 11, 12, and 14 perform processing operations, the stage processing section 1 invokes the spreadsheet 3 and effects settings for the input data in the "Input Value" and "Input Attribute" columns. The spreadsheet processing section 2 performs a spreadsheet processing operation, whereby the calculated data are received from the "Output Value" and "Output Attribute" columns of the spreadsheet 3.

An "Entry Name" column (indicated by arrow A shown in FIG. 5) is an area where descriptions (e.g., date or the monetary amount) included in form data 1a will be displayed. The information having the same contents as those of the definition information (Entry Names indicated by symbol B shown in FIG. 3) read from the contents of form data 1a is displayed in the area of the "Entry Name."

The "Input Value" column (indicated by arrow B shown in FIG. 5) is an area where the data items entered in form data 1a will be set, and data items corresponding to the "Entry Name" column (indicated by arrow C shown in FIG. 3) will be set in this area. The "Input Attribute" column (indicated by arrow C shown in FIG. 5) is an area where information pertinent to an input value will be entered. For example, information as to whether or not form data have been corrected by a previous operator (e.g., a message which reads "Corrected by a previous operator") is entered in the "Input Attribute" column. More specifically, a description concerning the reliability of the information, such as information as to whether or not the monetary amount has been corrected, is entered in the "Input Attribute" column. In the example shown in FIG. 5, since there is no information pertinent to an input value, there is no description entered in the "Input Attribute" column.

The "Output Value" column (indicated by arrow D) is an area where the data obtained as a result of spreadsheet processing of the data entered in the "Input Value" column will be displayed. With regard to the data shown in FIG. 5, when "1996" is entered as an input value in the "Input Value" column, "Heisei 8" (indicating the year according to the Japanese calendar) is displayed as an output value in the "Output Value" column.

The "Output Attribute" column (indicated by arrow E) is an area where information (e.g., a remark) pertinent to the thus-obtained data (i.e., the output value) will be entered. In the case of the data shown in FIG. 5, a message "Date Error" appears with respect to the input data whose output value is 31. Here, the number "31" represents the date of "November 31." Since such a date is not included in an actual calendar, the foregoing message appears.

The "Work Area" column (indicated by arrow G) is an area where various conditions regarding the received form data are set. Required conditions with regard to the received data can be freely set in this "Work Area" column. With regard to areas where descriptions are entered, such as a title row (indicated by arrow J), the "Output Attribute" column, and the "Work Area" column provided in the spreadsheet 3, data are entered into these areas by the operator through use of an input section 5, which will be described later.

In the spreadsheet 3 shown in FIG. 5, function key menus (indicated by arrow H) are provided in line in an upper portion of the screen. The received data are subjected to required processing (e.g., a terminating or holding operation) by means of the function key.

The auxiliary processing table unit 4 shown in FIG. 1 is used for preparing the above-described spreadsheet 3. For example, as shown in FIG. 1, the auxiliary processing table unit 4 comprises a stage definition section 40, a job definition section 41, and an automatic generation section 42.

The stage definition section (the main processing definition section) 40 stores the type of a received job (i.e., the name of form data) and the name of a spreadsheet (i.e., the name of an auxiliary processing table) used for processing form data 1a. More specifically, the stage definition section 40 comprises a stage table 40A (see FIG. 6) and a stage definition information table 40B (see FIG. 7).

The stage table 40A shown in FIG. 6 is prepared on the basis of given definition information set for each of the stages provided in the stage processing section 1. For example, as shown in FIG. 7, the stage table 40A is prepared on the basis of the definition information (i.e., a stage definition information table 40B) such as "Title," "Category," "Job to be Processed," "Sheet," and "Destination Information."

The "Title" shown in FIG. 7 represents the title of a stage (in the stage processing section 1) used for processing the received form data 1a. For instance, the title of processing (α), such as correction, verification, and recognition, is entered in this "Title" row. The "Category" represents whether or not form data are to be processed on the screen, so as to distinguish form data 1a to be processed on the screen from a set of form data 1a which do not require use of the screen.

The "Job to be processed" represents the type of job, and for each stage (i.e., for each name of a stage), the type name of form data 1a to be processed (e.g., the details of jobs such as payment or receipt) is entered into the "Job to be processed" row. In short, the type of job (Job A, Job B, or Job C indicated by arrow D shown in FIG. 6) is entered into the area of the "Job to be processed."

The "Sheet" represents the spreadsheet 3 used for each stage, and the names of all the spreadsheets (Sheet A–P . . .) corresponding to the types of jobs to be processed are entered into the "Sheet" row. In short, the names of all the sheets (indicated by arrow E shown in FIG. 6) are entered into the "Sheet" row.

The "Destination Information" represents a destination to which form data 1a are to be sent after being sorted. Potential situations in each stage, such as a request for recognition (I) or hold (II), are set as destinations (I, II, and III). Moreover, destinations may be set according to the monetary amount.

The stage definition section 40 is designed so as to prepare the stage table 40A shown in FIG. 6 on the basis of the descriptions of the stage definition information table 40B. For each type of job (e.g., for each of Jobs A, B, and C), the names of the spreadsheets (e.g., Sheet A-P . . .) relevant to the respective processing operations (e.g., the preliminary checking/editing operation, the input checking/editing operation, and the destination determination operation) performed by the stage processing section 1 are entered into the stage table 40A shown in FIG. 6.

As mentioned previously, the stage definition section 40 has the stage table 40A (see FIG. 6), in which the name of form data [particularly, the category of a processing operation for each job (e.g., the preliminary checking/editing operation, the input checking/editing operation, or the destination determination operation)] and the spreadsheet 3 used for processing form data are stored so as to correspond to one another. Consequently, the spreadsheet 3 corresponding to form data 1a to be processed can be speedily extracted.

The job definition section (or a form data definition section) 41 shown in FIG. 1 stores the type of job (i.e., the name of form data) and entry names constituting form data 1a (e.g., information pertinent to the entries). For example, as shown in FIG. 8, the job definition section 41 has a table (a job table 41A) into which entry names 41a to 41d constituting form data 1a are stored for a plurality of job types (e.g., Job A to Job D), respectively. The entry names 41a to 41d correspond to the definition information (indicated by symbol B shown in FIG. 3) provided for each of the job types shown in FIG. 3.

Since the job definition section 41 has the job table 41A that stores the name of form data and the entry names constituting form data 1a, the corresponding entry names 41a to 41d can be readily added or changed for each set of form data, enabling increased flexibility in preparation of the spreadsheet 3 in the automatic generation section 42, which will be described later.

The automatic generation section (i.e., an auxiliary processing table preparation section) 42 prepares the spreadsheet 3 on the basis of the information stored in the stage definition section 40 and the job definition section 41.

More specifically, upon receipt of a job type (indicated by arrow D shown in FIG. 6) and the name of a spreadsheet (indicated by arrow E shown in FIG. 6) from the stage definition section 40, the automatic generation section 42 initially prepares a new model of the spreadsheet 3 [a spreadsheet model comprising a preset title row (indicated by arrow J shown in FIG. 5) and blank columns] on the basis of the name of the spreadsheet. Subsequently, on the basis of the job type received from the stage definition section 40, the automatic generation section 42 receives the entry names 41a to 41d (see FIG. 8) set in the job definition section 41 corresponding to the received job type. The thus-received entry names are entered into the "Entry Name" column of the newly-prepared model of the spreadsheet 3.

In preparing the spreadsheet 3, the details of the specific processing corresponding to each of the processing operations performed in the stage processing section 1 are set through use of the input section 5 shown in FIG. 1.

To this end, by means of the input section 5, the automatic generation section 42 is designed so as to set a default to the "Output Attribute" column of the newly-prepared spreadsheet 3 or to effect settings for another entry item (e.g., a title row). In short, the automatic generation section 42 prepares a new spreadsheet 3, such as that shown in FIG. 5, which has blank "Input Value," "Input Attribute," and "Output Value" columns (see columns indicated by area I shown in FIG. 5). The input operations performed by the input section 5 may be executed by an input device of the entry terminal (designated by reference numerals 53a, 53b shown in FIG. 21) or by another input device.

More specifically, since the automatic generation section 42 allows the user to freely set the items to be set in the spreadsheet 3 used for the form document processing operation, opinions of the user at the site of work can be immediately reflected in the operation. Without reference to the details of the task of the received form data 1a, form data can be appropriately processed.

The automatic generation section 42 comprises means for receiving the type of job and the name of a spreadsheet from the stage definition section 40; means for capturing, on the basis of the job type, information about the entry items that constitute form data 1a and are stored in the job definition section 41; means for entering the information about the entry items constituting form data 1a into the corresponding areas of the spreadsheet 3 specified by the name of the spreadsheet; and means for entering the details of specific processing—which are received from the input section 5 and which the spreadsheet processing section 2 is requested to perform—into the corresponding areas of the spreadsheet 3.

The spreadsheet 3 prepared by the automatic generation section 42 is used when the processing sections 11, 12, and 14 of the stage processing section 1 perform processing operations. Specifically, each of the processing sections 11, 12, and 14 selects the thus-prepared spreadsheet 3 according to the type of processing and enters input data into the thus-selected spreadsheet 3, causing the spreadsheet processing section 2 to process the spreadsheet 3.

Each of the processing sections 11, 12, and 14 of the stage processing section 1 comprises means for extracting (or acquiring) the type of job from the received form data 1a; means for selecting the spreadsheet 3 specified by the name of a spreadsheet corresponding to the extracted job type, by reference to the information stored in the stage definition section 40; and means for entering the received form data 1a into the corresponding areas of the thus-selected spreadsheet 3. Accordingly, the input data can be entered into the proper spreadsheet 3 corresponding to the details of the processing.

Each of the processing sections 11, 12, and 14 of the stage processing section 1 enables the externally provided spreadsheet processing section 2 to perform the specific processing determined by the contents of form data 1a. Therefore, even when the details of the processing operation belonging to each of the processing sections 11, 12, and 14 are changed according to the contents of form data 1a, the user simply has to change the details of the settings of the spreadsheet 3 used for the operations of the externally provided spreadsheet processing section 2, without need to reconfigure the processing sections 11, 12, and 14 themselves. Accordingly, the degree of freedom of the user who performs the form document processing can be increased.

The preliminary checking/editing spreadsheet, the input checking/editing spreadsheet, and the destination determination spreadsheet mentioned previously will now be described.

The preliminary checking/editing spreadsheet is used by the preliminary checking/editing section 11 of the foregoing stage processing section 1 and has a configuration such as that shown in FIGS. 9(a) and 9(b).

FIG. 9(a) shows the program data set in a preliminary checking/editing spreadsheet 30. The program data are entered by the input section 5 shown in FIG. 1. FIG. 9(b) shows one example of calculation performed through use of the preliminary checking/editing spreadsheet 30.

When the automatic generation section 42 prepares the preliminary checking/editing spreadsheet 30, data are entered to the "Entry Name," "Page," columns and "Output Attribute" column (designated by area "a" shown in FIG. 9(a)) in the manner as mentioned previously. The preliminary checking/editing section 11 enters the contents of form data 1a into the "Input" column, whereby the spreadsheet processing section 2 performs spreadsheet processing operations. As a result, the data to be obtained (i.e., the data to be checked) are calculated and entered into the "Output" column.

In short, as a result of setting of the information [e.g., "97," "6," and "31" indicated by arrow B shown in FIG. 9(b)] that is read from the received form data 1a so as to correspond to the entry names of the preliminary checking/editing spreadsheet 30 [e.g., "Year," "Month," and "Day" indicated by arrow A shown in FIG. 9(b)], the data to be actually obtained and the determination as to whether the data are true or false ("TRUE" or "FALSE" indicated by reference code C shown in FIG. 9(b)) can be obtained by calculation.

If no information corresponding to the entry names is received, the data (e.g., information corresponding to the date on which the operator is actually performing an operation; that is, "97," "8," and "4") set as the default (indicated by arrow E shown in FIG. 9(b)) are entered as the input data. Although the spreadsheet 30 shown in FIG. 9(b) does not include the "Input Attribute" and "Work Area" columns, these columns may be formed in the spreadsheet in the same manner as those (indicated by arrows C and G) provided in the spreadsheet shown in FIG. 5.

Figure 10:
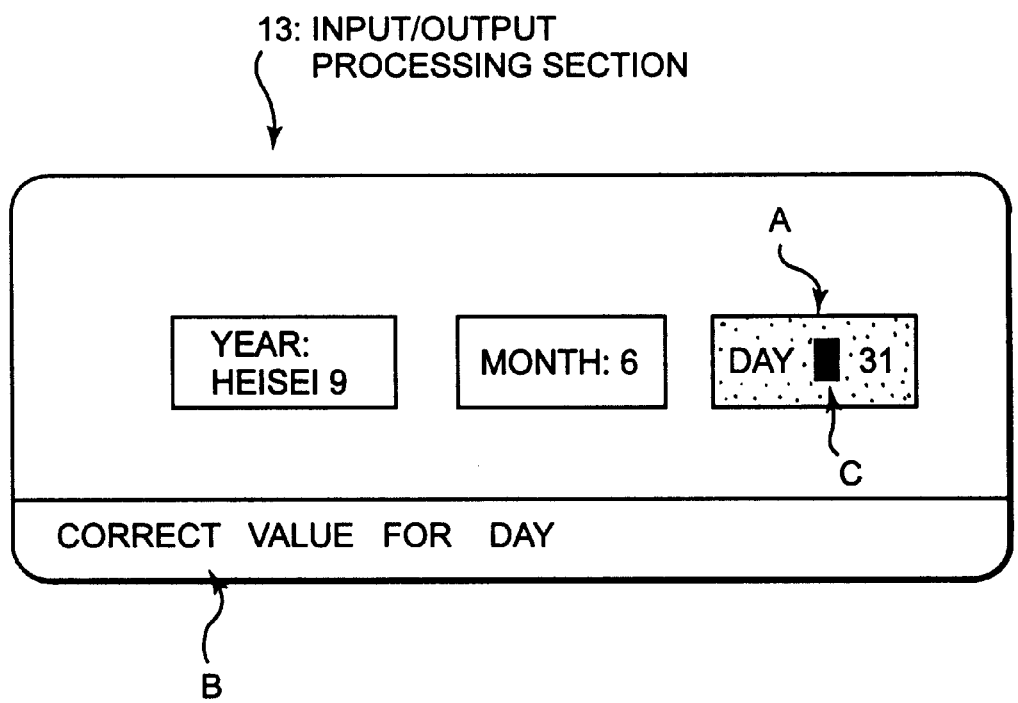
FIG. 10 is a schematic representation showing one example of a set of data obtained through the preliminary checking/editing operation performed by the main processing section according to the embodiment of the present invention.

As shown in FIG. 10, the data thus obtained by the preliminary checking/editing section 11 are actually indicated in, e.g., the input/output processing section 13 via the input checking/editing section 12.

More specifically, the value included in the "Screen Edit" column shown in FIG. 9(b) (indicated by reference symbol C) is displayed on the screen shown in FIG. 10. If a set of data (e.g., "31" in this example) has indication "FALSE" in the "Check" column (indicated by reference symbol C shown in FIG. 9(b)) shown in FIG. 9(b), this set of data is indicated in another color (e.g., in red) so as to become distinguished from the other sets of data (see the example indicated by arrow A shown in FIG. 10). Although the screen display shown in FIG. 10 corresponds to the processing comparable to that shown in FIG. 4, another example is expressed.

At this time, an error message appears on the same screen on which the data are displayed in color (see the error message indicated at the bottom of the screen shown in FIG. 10). This error message is designed in such a way as to indicate the information (i.e., "Correct the designated date") included in the "Message" column (indicated by arrow D shown in FIG. 9(b)).

A cursor (indicated by arrow C shown in FIG. 10) is also indicated together with the data displayed in color. The input checking/editing section 12 is allowed to correct the information highlighted by the cursor, by removal of the information item from the "Screen Edit" column shown in FIG. 9(b).

Figure 11B:
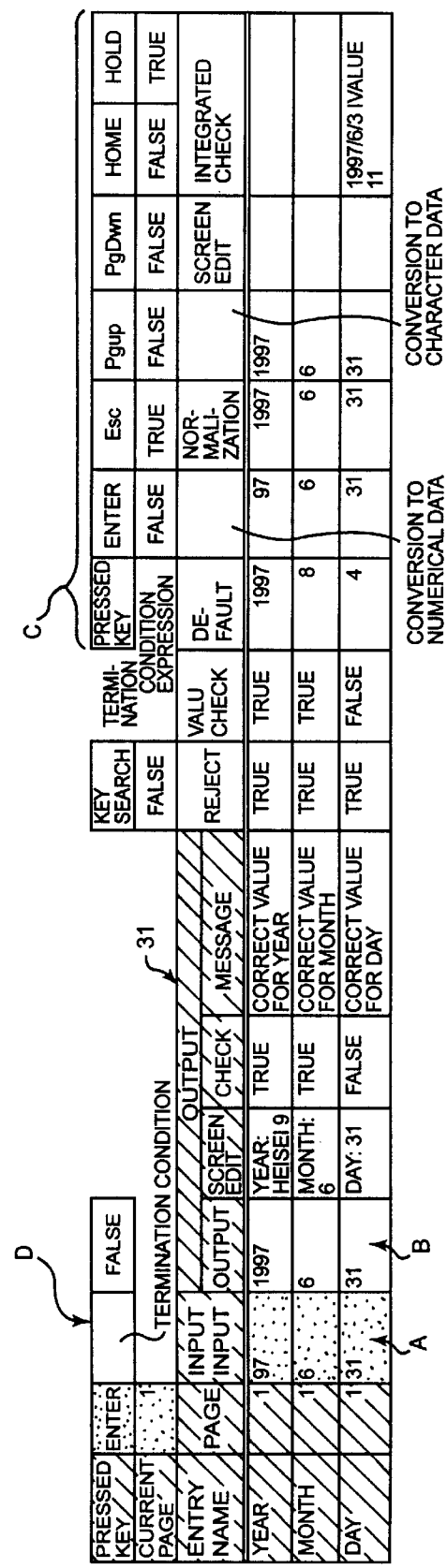

When the input checking/editing section 12 corrects the data received from the preliminary checking/editing section 11 shown in FIG. 10, the input checking/editing section 12 is arranged so as to use, e.g., an input checking/editing spreadsheet 31, such as that shown in FIGS. 11(a) and 11(b).

FIG. 11(a) shows the program data to be set in the input checking/editing spreadsheet 31, and FIG. 11(b) shows an example of calculation performed through use of the input checking/editing spreadsheet 31.

More specifically, the input checking/editing section 12 makes a correction to the data received from the preliminary checking/editing section 11 and enters the thus-corrected data into the "Input" column (indicated by arrow A shown in FIG. 11(b)) of the input checking/editing spreadsheet 31.

At this time, the input checking/editing section 12 sets completion conditions to be used for making a decision as to whether or not the thus-corrected set of data is suitable for transmission to the destination determination section 14 in the subsequent stage. The spreadsheet processing which the input checking/editing section 12 requests the spreadsheet processing section 2 to perform through use of the input checking/editing spreadsheet 31 is carried out by setting both the corrected set of data and the termination condition.

To transmit the corrected data to the destination determination section 14, the operator presses any one of the function keys on the screen (e.g., "Enter" key, "Esc" key, ..., or "Hold" key indicated by reference symbol C shown in FIG. 11(b)). The data can be transmitted under the termination condition ("FALSE" or "TRUE") set for the function keys. If the termination condition is set to TRUE, the input checking/editing section 12 is allowed to transmit the corrected set of data to the destination determination section 14.

For example, although the "Enter" key is pressed for the input checking/editing spreadsheet 31 shown in FIG. 11(b), the termination condition set for that key is FALSE (indicated by arrow D shown in FIG. 11(b)), and therefore the corrected set of data cannot be transmitted to the destination determination section 14.

In the case of the set of data shown in FIG. 11(b), in order to transmit the corrected data to the destination determination section 14, the operator has no alternative way but to re-set the input value (or corrected data) or to press either the "Esc" or "Hold" key (indicated by arrow C shown in FIG. 11(b)) whose termination condition is set to TRUE.

As mentioned above, the preliminary checking/editing section 11, the input checking/editing section 12, and the input/output processing section 13, all executing spreadsheet processing through use of the screen, are capable of performing the checking for, as well as editing of, the contents of form data 1a, as well as using the output attribute obtained through the checking operation as an error message or input guidance by calling a spreadsheet tool(by using the spreadsheet 3). Therefore, the operator can perform operations more speedily by reference to the message, rendering the entry tasks efficient.

Figure 12B:
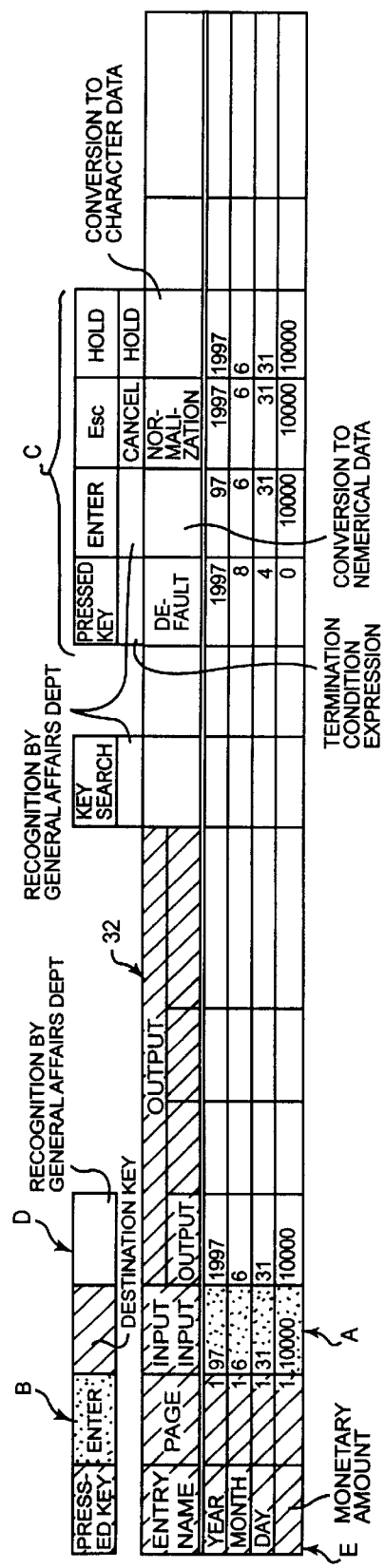

Next, the destination determination spreadsheet is used by the destination determination section 14 of the stage processing section 1. For example, the destination determination spreadsheet has a configuration such as that shown in FIGS. 12(a) and 12(b). FIG. 12(a) shows the program data set in a destination determination spreadsheet 32, and FIG. 12(b) shows an example of calculation performed through use of the destination determination spreadsheet 32.

In the example shown in FIGS. 12(a) and 12(b), the "Monetary Amount" is included in the "Entry Name" column (indicated by arrow E shown in FIG. 12(b)). Although the monetary amount is actually included in the sheets shown in FIGS. 9 and 11, it is omitted from the drawings for the sake of convenience. Data calculated by the destination determination sheet 32 are transmitted solely to the destination without undergoing editing processing, and hence the output data are subjected to solely normalization with regard to the editing operation ("Output Attribute").

Upon receipt of the corrected set of data and the information about the pressed function key which serves as a termination condition from the input checking/editing section 12, the destination determination section 14 enters the corrected set of data into the "Input" column of the destination determination spreadsheet 32 (e.g., "97," "7," "1," and "10000" indicated by arrow A shown in FIG. 12(b)). The information about the pressed key is entered into the "Pressed Key" column (e.g., "Enter" indicated by arrow B shown in FIG. 12(b)), and the spreadsheet processing section 2 performs spreadsheet processing. Here, the corrected set of data received by the destination determination section 14 is a set of data obtained by newly making a correction to the set of data shown in FIG. 11(b).

The information about a pressed key received from the input checking/editing section 12 is entered as information which the destination determination section 14 uses to set a termination condition. More specifically, as indicated by reference symbol C shown in FIG. 12(b), if the information about the pressed function key represents "Enter," corrected data are sorted into a "Recognition by General Affairs Dept" column. In contrast, if the information represents "Esc," corrected data are entered into a "Cancel" column. Further, if the information represents "Hold," corrected data are entered into a "Hold" column.

The destination determination section 14 is particularly designed so as to determine a destination on the basis of the information about a "monetary amount" of the corrected data. For this reason, if the information about the pressed key represents "Enter," simplified recognition will be set, depending on a monetary amount.

For example, in the case shown in FIG. 12(b), "Enter" is entered into the "Pressed Key" column on the basis of the received information about the pressed key, and "Recognition by General Affairs Dept" is entered (as a destination) into a "Destination Key" column (indicated by arrow D).

As mentioned previously, as a result of invoking a spreadsheet tool, the destination determination section 14 determines a destination through the checking for, as well as editing of, the contents of form data 1a, and is capable of using the output attribute obtained by checking form data as a message used when form data are forwarded. Accordingly, the operator can perform operations more speedily by reference to the message. Even in this case, the entry tasks can be rendered efficient.

The spreadsheet 3 used for performing the foregoing processing operations (i.e., a preliminary checking/editing operation, an input checking/editing operation, and a destination determination operation) may be formed into one spreadsheet 3 which is shared among the processing operations or formed into discrete spreadsheets 3.

Figure 21:
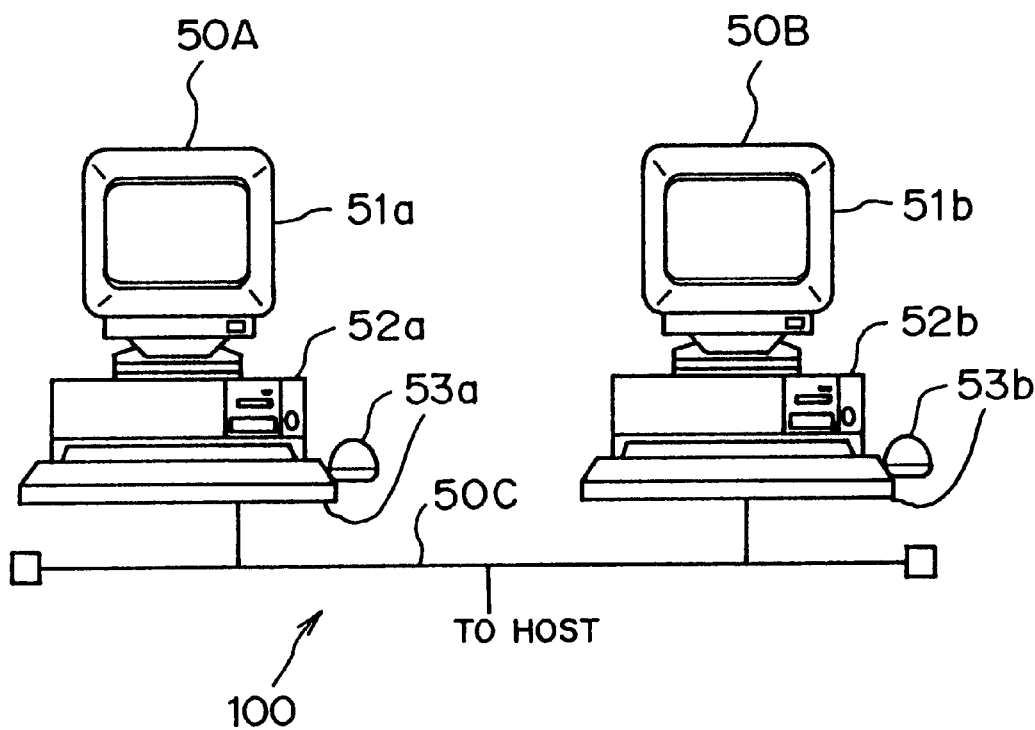
FIG. 21 is a schematic representation showing the configuration of a general entry system.

In the form document processing apparatus 70 according to the present embodiment, functions corresponding to the stage processing section 1 and the auxiliary processing table preparation unit 4 (see FIG. 1) are implemented in the form of the operation of a processor circuit; for example, by reading in unillustrated memory (RAM) the form document processing program recorded on a recording medium (not shown) of a disk unit of each of a plurality of computers (more specifically, such as the entry terminals 50A, 50B shown in FIG. 21), and by initiating the form document processing program and executing the thus-initiated program by means of an unillustrated processor circuit (e.g., CPU).

When form data 1a are subjected to, among the processing operations performed on the received form data 1a, the specific processing operation determined by the contents of form data 1a, the form document processing program causes the computer to execute transmission procedures (corresponding to the operations required by each of the processing sections 11, 12, and 14, setting data in the spreadsheet 3, and transferring the spreadsheet 3 to the spreadsheet processing section 2) for transmitting form data 1a to an external unit (i.e., to the spreadsheet processing section 2) and causes the computer to request procedures for requesting the external section to perform the specific processing operation on the form data 1a transmitted through the transmission procedures.

The form document processing program is recorded on, e.g., a CD-ROM or the like, and is used after having been installed from the CD-ROM or the like into a disk unit or the like of the computer.

The foregoing spreadsheet processing section 2 is implemented by execution of a general-purpose spreadsheet processing program. For example, a known general-purpose spreadsheet processing program such as EXCEL (trade name) can be utilized as the general-purpose spreadsheet processing program. Since the form document processing apparatus 70 is configured through use of a general-purpose spreadsheet processing program in the manner as mentioned previously, the potential extent of application of the form document processing apparatus 70 can be increased. In short, the degree of freedom of the form document processing apparatus 70 can be significantly increased.

As a matter of course, instead of a general-purpose spreadsheet processing program represented by EXCEL (trade name), another spreadsheet processing program (a spreadsheet processing program already used by the user) may be used for the form document processing apparatus 70.

Any spreadsheet processing program may be used as the foregoing spreadsheet processing program (i.e., a spreadsheet processing tool), so long as the program has the capability of cooperating with external programs. Depending on the function of a spreadsheet processing program, spreadsheet processing may be executed while the external program cooperates further with an external section. In addition, the spreadsheet processing program may be executed in a cooperative manner among the spreadsheets 3 used for the spreadsheet processing program.

The spreadsheet 3 is stored in a recording medium, such as a disk unit or memory (RAM) (neither of which is shown).

With the foregoing configuration, when the form document processing apparatus 70 shown in FIG. 1 receives form data 1a, the stage processing section 1 checks the contents of received form data 1a and displays the form data on the screen. The operator makes a correction to the thus-displayed form data, and the result of correction is checked to thereby determine a destination. Form data 1a is transmitted to a desired destination by way of the information transmission line (see FIG. 21) and the host computer (not shown).

Among the processing operations performed on the received form data 1a in the stage processing section 1, when the specific processing operation determined by the contents of form data 1a is performed, each of the processing sections 11, 12, and 14 requests the spreadsheet processing section 2 to perform the specific processing operation (a requesting step). Upon receipt of the request, the spreadsheet processing section 2 performs the specific processing operation in an auxiliary manner in place of each of the processing sections 11, 12, and 14 and through use of the spreadsheet 3 corresponding to the type of job and the details of the processing operation (an auxiliary processing step).

On the basis of the information stored in both the stage definition section 40 and the job definition section 41, as well as on the basis of the information received is from the input section 5, the automatic generation section 42 of the auxiliary processing preparation unit 4 prepares a plurality of spreadsheets 3 having the details of the specific processing operation set therein according to the job type and the details of a processing operation (an auxiliary processing table preparation step). In order to cause the spreadsheet processing section 2 to perform the specific processing operation, each of the processing sections 11, 12, and 14 selects a spreadsheet 3 from the plurality of spreadsheets 3 according to the job type and the details of a processing operation, and input data are entered into the thus-selected spreadsheet 3.

On the basis of the details of the settings entered in the spreadsheet 3, the spreadsheet processing section 2 performs the specific processing operation.

Figure 13:
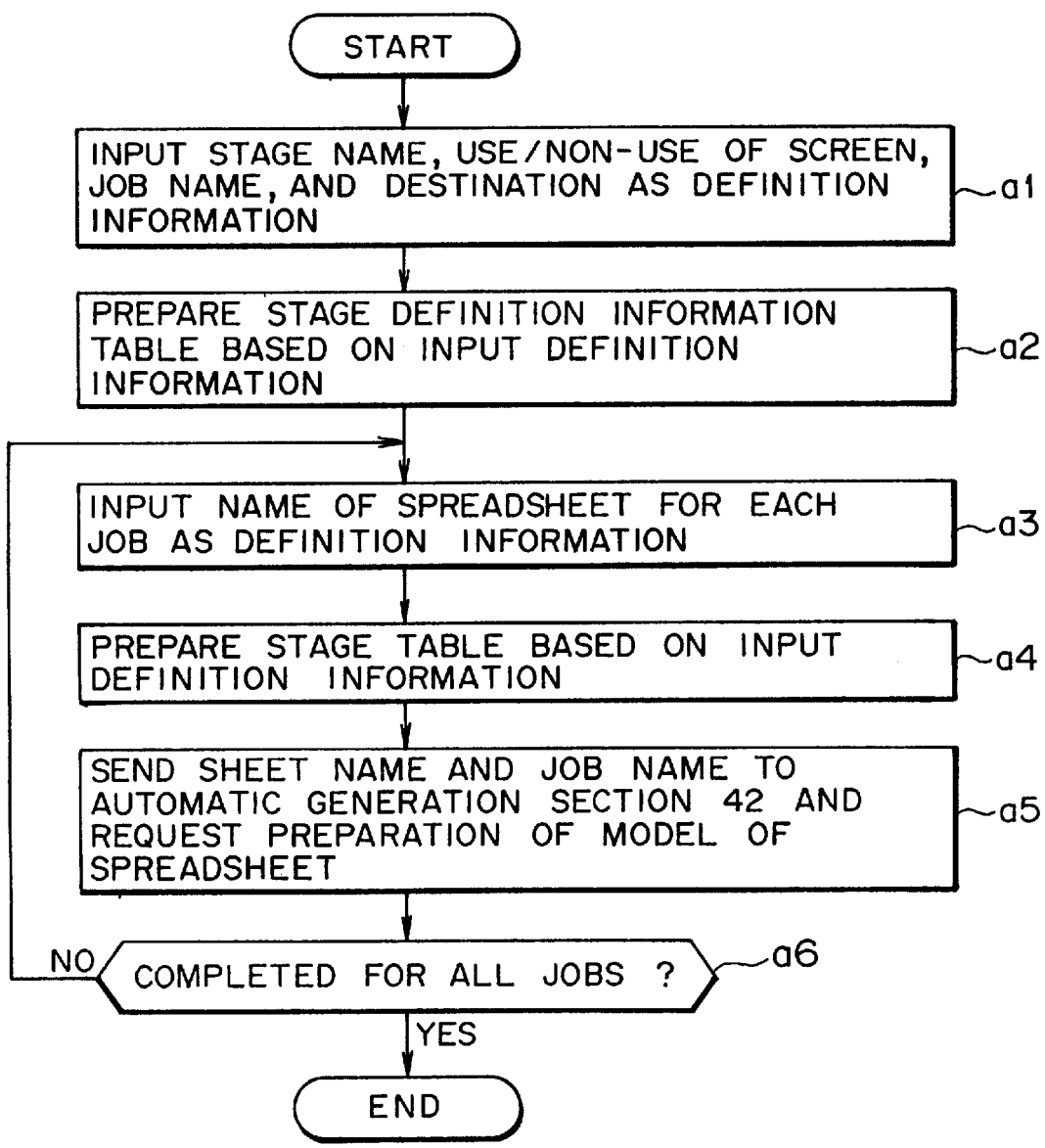
FIG. 13 is a flowchart for explaining main processing definition processing of the form document processing apparatus according to the embodiment of the present invention.
Figure 14:
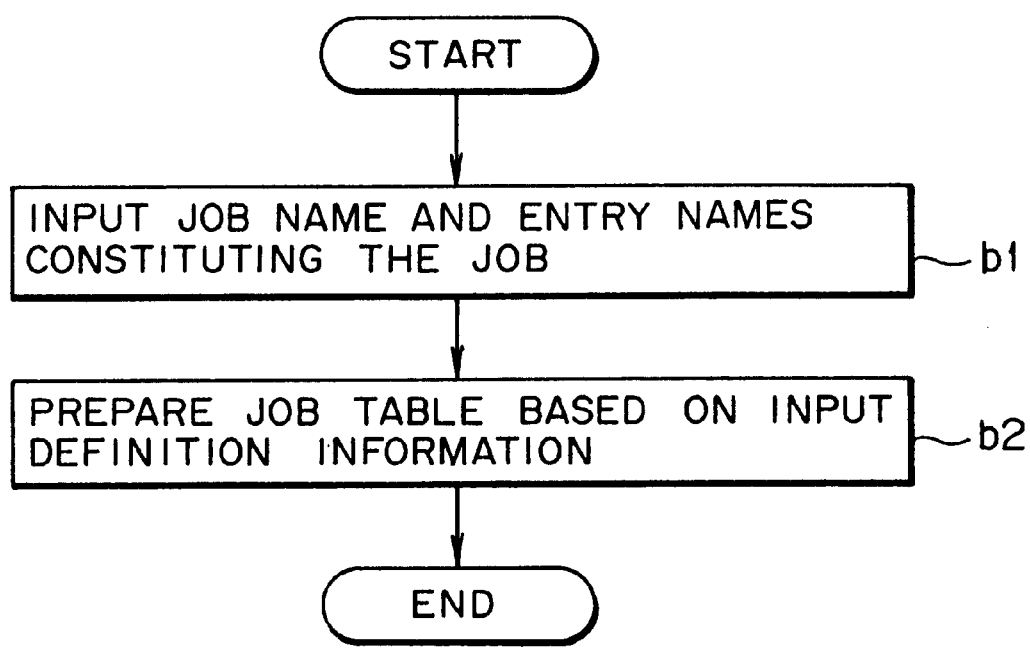
FIG. 14 is a flowchart for explaining form data definition processing of the form document processing apparatus according to the embodiment of the present invention.
Figure 15:
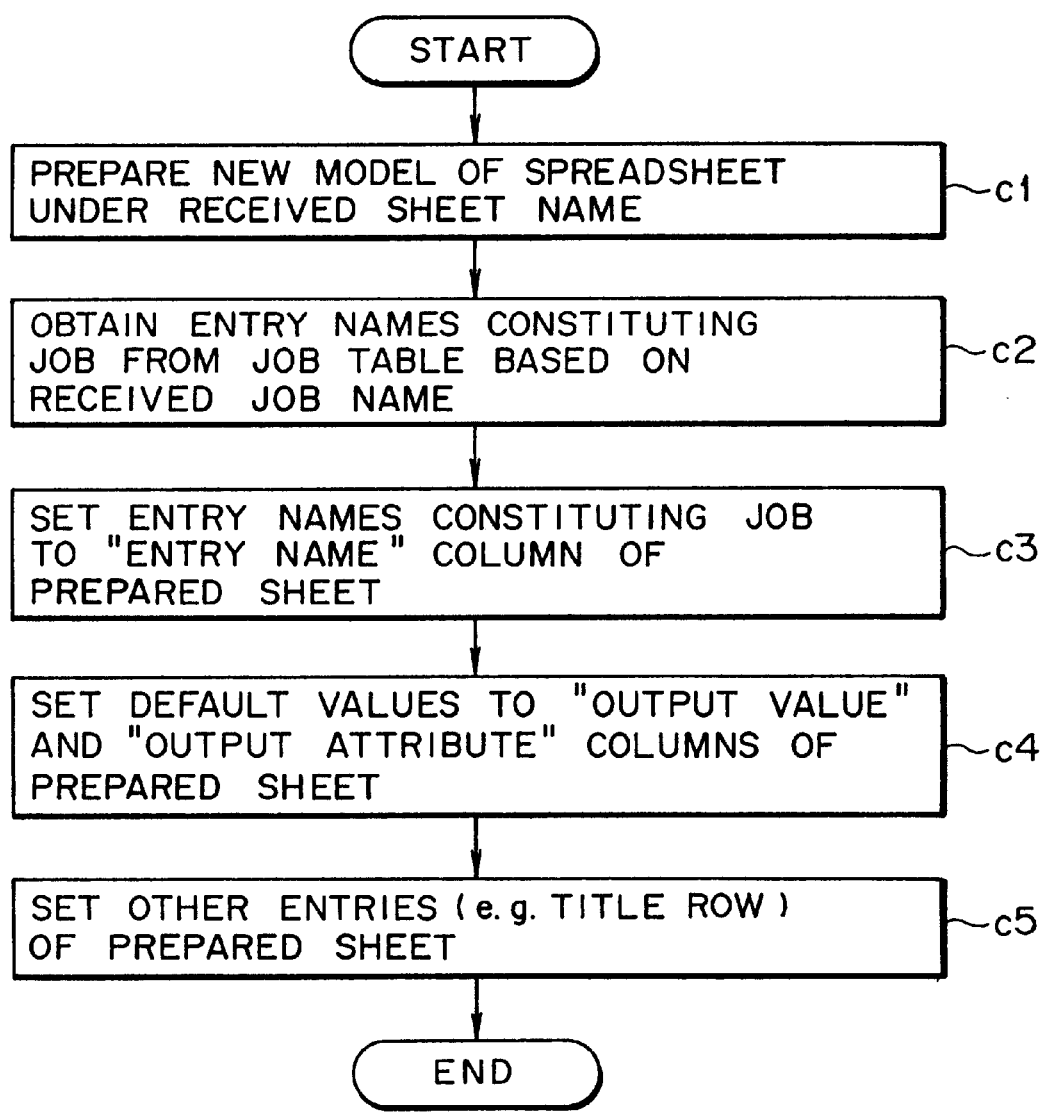
FIG. 15 is a flowchart for explaining auxiliary processing table preparation processing of the form document processing apparatus according to the embodiment of the present invention.

According to the flowcharts shown in FIGS. 13 to 15, pre-processing required by the form document processing apparatus 70 to perform form document processing (e.g., each of the processing operations performed by the stage definition section 40, the job definition section 41, and the automatic generation section 42) will be described in detail.

First, the stage definition processing of the stage processing section 40 will be described. The form document processing apparatus 70 reads, as definition information from a received set of data form 1a, the title of a stage, information as to whether or not there are any items to be processed on the screen, the type of job (i.e., a job to be processed), and destination information (step a1 shown in FIG. 13). A stage definition information table 40B (see FIG. 7) is prepared on the basis of the thus-read definition information for each set of form data 1a (step a2).

Subsequently, the form document processing apparatus 70 receives the name of the spreadsheet 3 from the stage definition information table 40B as definition information for each job type (step a3). After having prepared the stage table 40A on the basis of the thus-received definition information (step a4 shown in FIG. 6), the spreadsheet name and the job type are transmitted to the automatic generation section 42 from the stage table 40A, and the automatic generation section 42 is requested to prepare a model of the spreadsheet 3 (step a5).

In short, the automatic generation section 42 is requested to prepare the model of the spreadsheet 3 corresponding to the processing operations of each set of form data 1a shown in FIG. 6 (i.e., a preliminary checking/editing operation, an input checking/editing operation, and a destination determination operation). The request processing is executed by the operator.

The form document processing apparatus 70 determines whether or not the model of the spreadsheet 3 has been prepared for all sets of form data 1a (step a6). If the model of the spreadsheet has not been prepared for all of the sets of form data 1a (NO in step a6), the name of the spreadsheet 3 is input to the form document processing apparatus 70 as definition information for each job type (step a3), to thereby prepare the stage table 40A (step a4).

If the model of the spreadsheet 3 has been prepared for all the job types (YES in step a6), the stage definition processing will be terminated.

Next, the job definition processing of the job definition section 41 will be described. After having received the name of the set of form data 1a and the entry names constituting this set of form data 1a as definition information (step b1 shown in FIG. 14), the job table 41A is prepared on the basis of the received definition information (step b2 shown in FIG. 8). The job definition processing is terminated.

The automatic generation processing of the automatic generation section 42 will be described. Upon receipt of the name of the spreadsheet and the job type from the stage definition section 40, the form document processing apparatus 70 newly prepares the model of the spreadsheet 3 under the received spreadsheet's name (step c1 shown in FIG. 14). Further, according to the received job type, entry names 41a to 41d constituting the set of form data 1a from the job table 41A of the job definition section 41 (step c2).

Subsequently, after having entered the entry names into the "Entry Name" column (indicated by arrow A shown in FIG. 5) of the newly prepared spreadsheet 3 (step c3), the form document processing apparatus 70 enters the default into the "Output Value" and "Output Attribute" columns of the spreadsheet 3 (indicated by arrows D and E shown in FIG. 5) (step c4). Further, the form document processing apparatus 70 enters another entry (e.g., title) into the spreadsheet 3 (step c5), and the automatic generation operation is terminated.

After the foregoing processing operations have been performed, the form document processing apparatus 70 executes a form document processing operation through use of the stage processing section 1.

Figure 16:
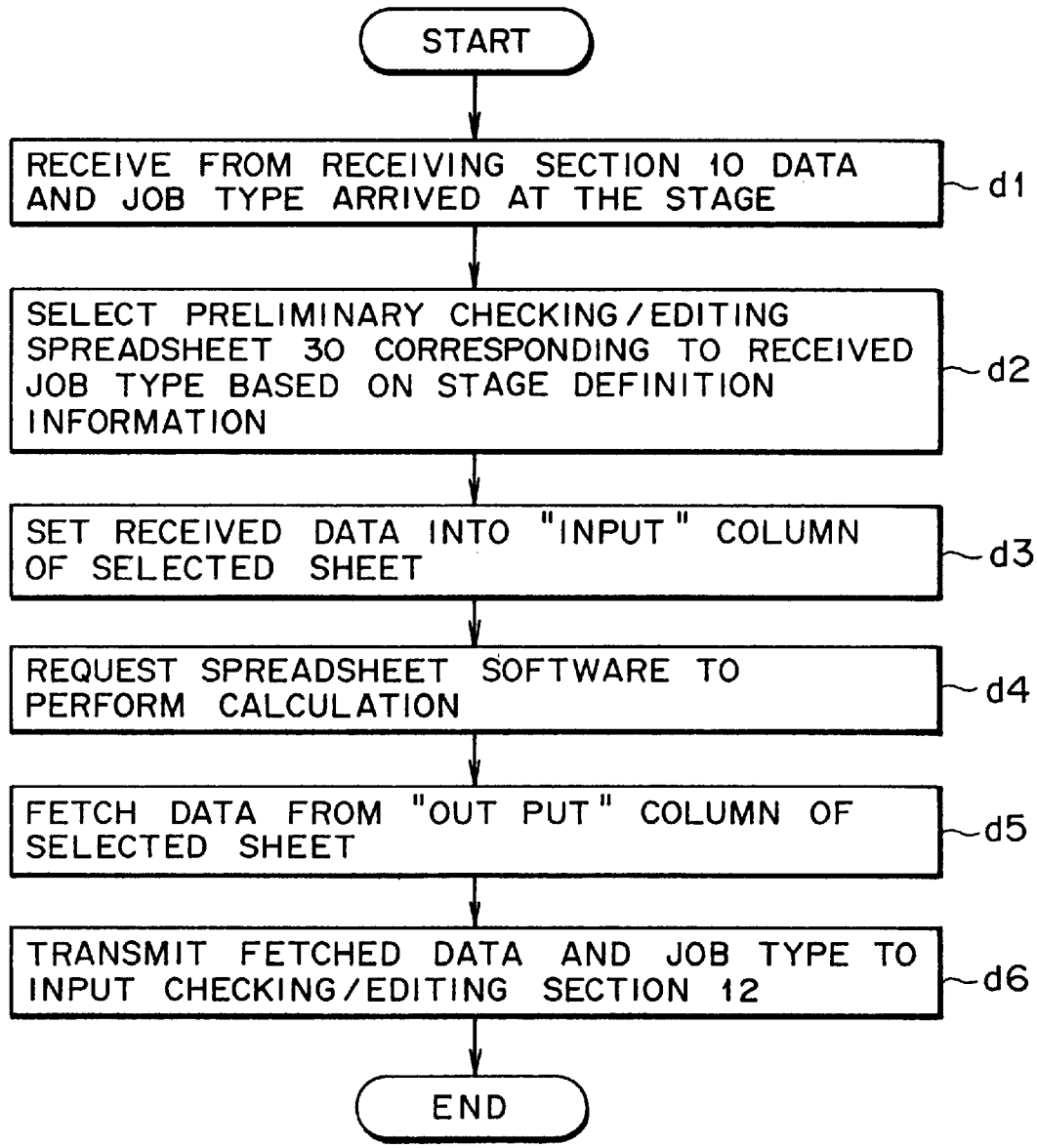
FIG. 16 is a flowchart for explaining the preliminary checking/editing operation of the main processing section according to the embodiment of the present invention.
Figure 17:
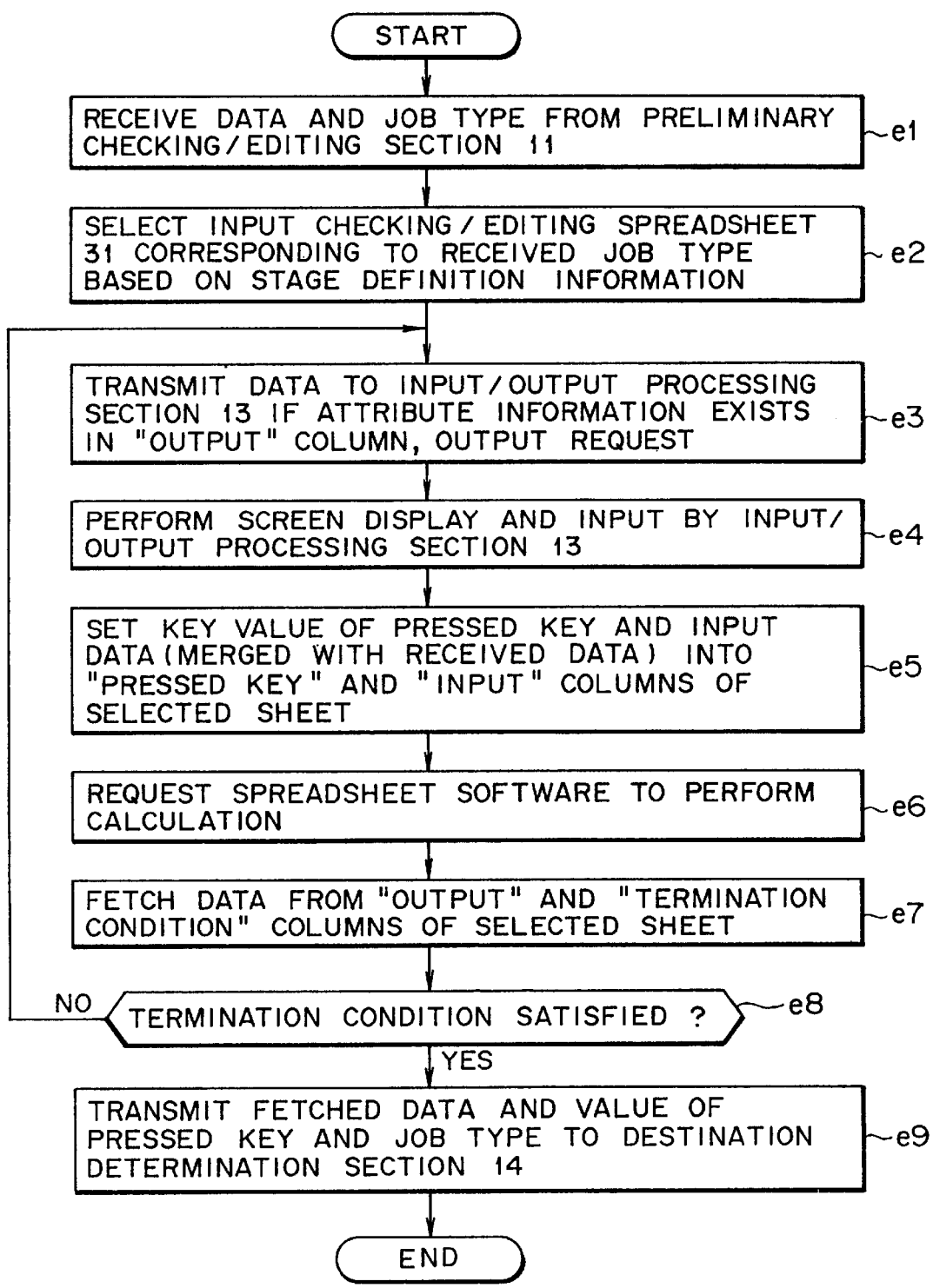
FIG. 17 is a flowchart for explaining the input checking/editing operation of the main processing section according to the embodiment of the present invention.
Figure 18:
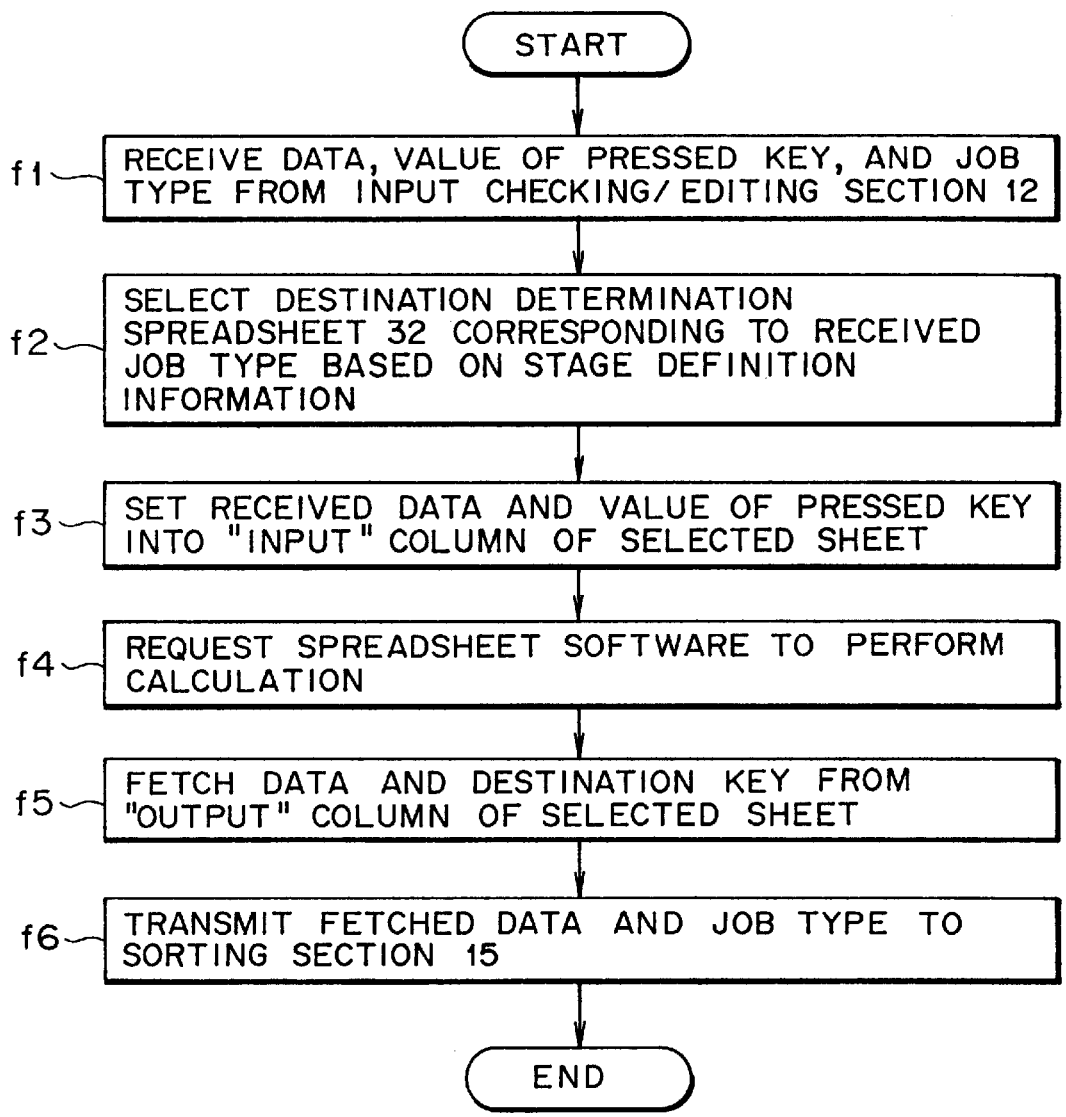
FIG. 18 is a flowchart for explaining the destination determination operation of the main processing section according to the embodiment of the present invention.

With reference to the flowcharts shown in FIGS. 16 to 18, the form document processing operation performed in the stage processing section 1 (i.e., a preliminary checking/editing operation, an input checking/editing operation, and a destination determination operation) will be described.

First, upon receipt of the contents of the set of form data 1a and it's job type from the receiving section 10 (step d1 in FIG. 16), the stage processing section 1 selects the preliminary checking/editing spreadsheet 30 corresponding to the job type on the basis of the stage table 40A of the stage definition section 40 (step d2).

The thus-received contents of the form data 1a are entered into the "Input" column of the thus-selected preliminary checking/editing spreadsheet 30 (step d3), and the spreadsheet processing section 2 is requested to process the thus-entered data through a spreadsheet processing operation (step d4).

In short, the stage processing section 1 enters the contents of the set of form data 1a into the preliminary checking/editing spreadsheet 30 and transmits the spreadsheet to the spreadsheet processing section 2 (a transmission procedure). The stage processing section 1 then requests the spreadsheet processing section 2 to process the data entered into the preliminary checking/editing spreadsheet 30 through a spreadsheet processing operation (a request procedure).

The result of the spreadsheet processing operation performed by the spreadsheet processing section 2 (the values entered into the "Output" column as a result of calculation) is fetched (step d5), and the thus-fetched result is transmitted to the input checking/editing section 12 together with the job type (step d6). The preliminary checking/editing operation performed by the preliminary checking/editing section 11 is now terminated.

Next, when the input checking/editing section 12 receives the contents of data resulting from the spreadsheet processing performed by the preliminary processing section 11 and the job type (step e1 shown in FIG. 17), the form document processing apparatus 70 selects a corresponding input checking/editing spreadsheet 31 on the basis of the stage table 40A of the stage definition section 40 for each job type (step e2).

The contents of data received by the input checking/editing section 12 are transmitted to the input/output processing section 13 (step e3), where the contents of data (see FIG. 10) are displayed on the screen. The operator makes corrections to erroneous portions of the data displayed on the screen (step e4).

Subsequently, the set of data thus corrected by the input/output processing section 13 and the information about the key pressed at the time of the correcting operation (i.e., termination condition) are entered into the "Input" and "Pressed Key" columns of the input checking/editing spreadsheet 31 selected in step e2 (step e5). The spreadsheet processing section 2 is requested to process the thus-entered set of data by spreadsheet processing (step e6).

More specifically, the stage processing section 1 enters the contents of the set of form data 1a into the input checking/editing spreadsheet 31 and transmits the spreadsheet to the spreadsheet processing section 2 (a transmission procedure), requesting the spreadsheet processing section 2 to process the data thus entered into the input checking/editing spreadsheet 31 through spreadsheet processing (a request procedure).

The set of corrected data resulting from spreadsheet processing and the information about the key pressed at the time of the spreadsheet processing are fetched (step e7), and a decision is made, on the basis of the pressed key information, as to whether or not the termination condition is satisfied (step e8).

As a result, if the termination condition is not satisfied (NO in step e8), the set of data received from the preliminary checking/editing section 11 is transmitted to the input/output processing section 13 (step e3). In contrast, if the termination condition is satisfied (YES in step e8), the set of corrected data, the pressed key information, and the job type are transmitted to the destination determination section 14 (step e9). The input checking/editing operation performed by the input checking/editing section 12 will now be terminated.

When the destination determination section 14 receives the contents of data edited by the input checking/editing section 12, the pressed key information, and the job type (step f1 shown in FIG. 18), the form document processing apparatus 70 selects a corresponding destination determination spreadsheet 32 on the basis of the stage table 40A of the stage definition section 40 for each job type (step f2).

The destination determination section 14 enters the thus-received data into the "Input" column of the thus-selected destination determination spreadsheet 32 and the pressed key information into the "Pressed Key" column (step f3), requesting the spreadsheet processing section 2 to process the thus-entered data through spreadsheet processing (step f4).

More specifically, the stage processing section 1 enters the contents of the set of form data 1a into the destination determination spreadsheet 32 and transmits the spreadsheet to the spreadsheet processing section 2 (a transmission procedure), requesting the spreadsheet processing section 2 to process the data thus entered into the destination determination spreadsheet 32 through spreadsheet processing (a request procedure).

The result of the spreadsheet processing operation performed by the spreadsheet processing section 2 and information about a destination are fetched (step f5), and the thus-fetched result and information are transmitted to the destination determination section 15 (step f6). The destination determination operation performed by the destination determination section 14 is now terminated.

The processing operations, which the processing sections 11, 12, and 14 request the spreadsheet processing section 2 to perform through use of the spreadsheets 30, 31, and 32 corresponding to the respective processing operations (step d4 shown in FIG. 16, step e6 shown in FIG. 17, and step f4 shown in FIG. 18), are requested to the spreadsheet section 2 provided outside the processing sections 11, 12, and 14.

As mentioned previously, in the present invention, among the processing operations to be performed on the received set of form data 1a by the stage processing section 1, the spreadsheet processing section 2 provided aside from the stage processing section 1 performs the specific processing operation determined by the contents of the set of form data 1a, imparting the form document processing apparatus with a degree of freedom required forneral-purpose applications. Since this eliminates the need to develop a program for the purpose of configuring an entry system for various task types, an entry system can be speedily configured with less labor and at lower cost.

Further, according to the present invention, the foregoing auxiliary processing table preparation unit 4 comprises the stage definition section 40, the job definition section 41, and the automatic generation section 42. Accordingly, the spreadsheet 3, which is required by the specific processing operation defined by the contents of the set of form data 1a, can be efficiently prepared according to the details of the processing operations of the respective processing sections 11, 12, and 14 without the need for an operator to enter all information necessary for the processing operations performed by the stage processing section 1.

Furthermore, according to the present invention, on the basis of the contents of a received set of form data 1a, the stage processing section 1 can perform a processing operation through use of the spreadsheet 3 suitable for the processing to be performed on the set of form data. Therefore, the form document processing apparatus of the present invention has the advantage of being able to perform suitable operations without reference to the descriptions of a job.

Moreover, according to the present invention, the form document processing apparatus holds a computer-readable recording medium having a form document processing program recorded thereon, and a form document processing operation can be performed through use of the recording medium. Therefore, there can be expected widespread use of an apparatus employing the form document processing method and apparatus according to the present invention.

Although the stage processing section 1 shown in FIG. 2 has been described in detail with reference to a case where the form document processing apparatus has the input/output processing section 13 and a given processing operation is performed on the set of form data 1a while the data are displayed on the screen, the given processing operation may be performed without displaying the set of form data on the screen by setting an automatic execution section 20 in a stage processing section 1A shown in FIG. 19. In this case, the stage definition information table 40B shown in FIG. 7 is arranged so as to indicate a hidden condition in the "Category" row.

Figure 19:
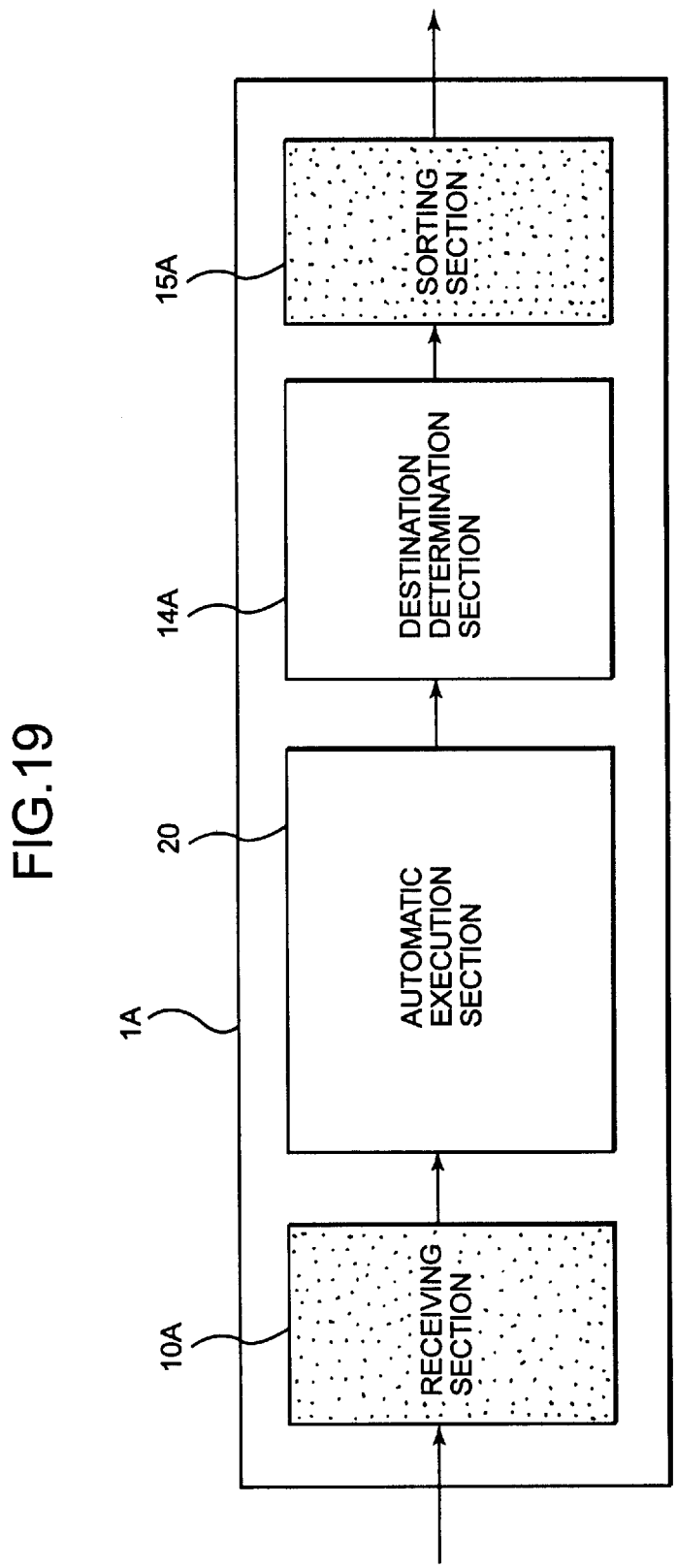
FIG. 19 is a block diagram showing a modification of the stage processing section according to the embodiment of the present invention.

More specifically, as shown in FIG. 19, the stage processing section 1A comprises a receiving section 10A, the automatic execution section 20, a destination determination section 14A, and a sorting section 15A. The receiving section 10A, the destination determination section 14A, and the sorting section 15A are the same or substantially the same as the receiving section 10, the destination determination section 14, and the sorting section 15 mentioned previously with reference to FIG. 1, and therefore their detailed descriptions will be omitted here for brevity.

The automatic execution section 20 performs a desired checking operation on a set of form data 1a received by the receiving section 10A. More specifically, on the basis of an identification code (or a check digit) assigned to the received set of form data 1a, the automatic execution section 20 makes a decision as to whether or not the received set of form data 1a are to be processed.

In short, the automatic execution section 20 enables a set of form data 1a to be automatically checked without intervention of the operator.

Figure 20:
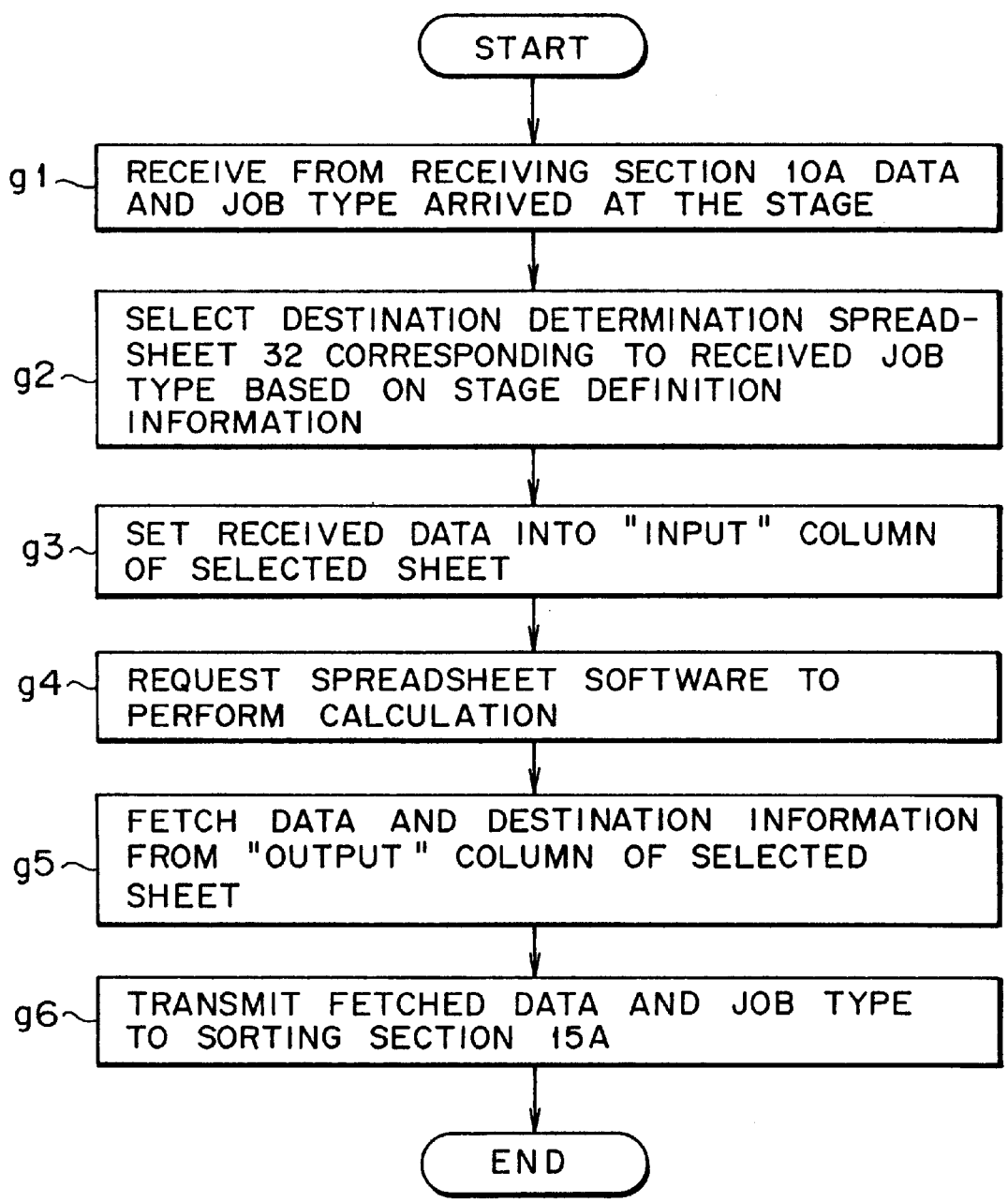
FIG. 20 is a flowchart for explaining the automatic execution processing of the modification of the stage processing section shown in FIG. 19.

An automatic execution processing operation performed by the stage processing section 1A shown in FIG. 19 will be described with reference to the flowchart shown in FIG. 20.

First, upon receipt of the contents of a set of form data 1a received from the receiving section 10A and its job type (step g1 shown in FIG. 20), the stage processing section 1A selects a corresponding destination determination spreadsheet 32 on the basis of the stage table 40A of the stage definition section 40 for each job type (step g2).

Subsequently, the contents of the thus-received set of form data 1a are entered into the "Input" column of the selected destination determination spreadsheet 32 (step g3), and the spreadsheet processing section 2 is requested to process the data set in the spreadsheet through spreadsheet processing (step g4).

More specifically, the stage processing section 1 enters the contents of the set of form data 1a into the destination determination spreadsheet 32 and transmits the spreadsheet to the spreadsheet processing section 2 (a transmission procedure), requesting the spreadsheet processing section 2 to process the data thus entered into the destination determination spreadsheet 32 through spreadsheet processing (a request procedure).

The output data resulting from spreadsheet processing performed by the spreadsheet processing section 2 and a piece of destination information based on the output data are fetched (step g5), and the thus-fetched data and a job type are transmitted to the destination determination section 15A (step g6). The automatic execution processing operation performed by the automatic execution section 20 will now be terminated.

The stage processing section 1 shown in FIG. 19 is capable of automatically transmitting a set of form data 1a, which does not require operator's operations, to a destination after automatically having checked the set of form data. Accordingly, the received sets of form data 1a can be distinguished from one another according to the details of processing, contributing to increased flexibility in system configuration of the form document processing apparatus.

A program capable of implementing the functions corresponding to the stage processing section 1 and the auxiliary processing table unit 4, as well as the functions corresponding to the spreadsheet processing section 2, can also be employed as the form document processing program.

Specifically, a program including a spreadsheet processing program itself may be used as a form document processing program. In this case, there will be obtained the advantage of being able to eliminate the need for additionally obtaining a spreadsheet processing program.

In this case, when a specific processing operation determined by the contents of a received set of form data 1a is performed, among the processing operations to be performed on the set of form data 1a, the form document processing program causes the computer to execute: a request procedure for requesting an external section to perform the specific processing operation; an auxiliary processing procedure for performing the specific processing operation in an auxiliary manner upon receipt of the request issued in the requesting procedure; an auxiliary processing table preparation procedure for preparing a spreadsheet 3 having set therein the details of the specific processing operation requested to be performed in the auxiliary processing procedure; and an auxiliary processing procedure for performing the specific processing operation on the basis of the details set in the spreadsheet 3 prepared in the auxiliary processing table preparation procedure.

Without reference to the foregoing embodiment, various modifications of the present invention are conceivable without departing the scope of the present invention. Although the present invention has been described in detail with reference to the service of a financial facility in the foregoing embodiment, it goes without saying that the present invention is not limited to the financial service but also applicable to services in other fields.

What is claimed is:

1. An apparatus for processing a variety of form documents, on each of which a plurality of entry items are recorded in a different specific form, according to the form of the individual form document, said apparatus comprising:
    a main processing section for carrying out a series of routine processing operations on input image data of each of the form documents regardless of the form of each said form documents and for issuing a request to carry out a series of specific processing operations on the image data of each said form documents in accordance with the form of each said form documents; and
    an auxiliary processing section, responsive to said request issued by said main processing section, for selecting from various series of specific processing operations one series of specific processing operations corresponding to the form of each said form documents and for carrying out the selected one series of specific processing operations to the image data of each said form documents.

2. A form document processing apparatus according to claim 1, further comprising one or more auxiliary processing tables containing details of the individual specific processing operation for each of said various series,
    wherein said auxiliary processing section is operable to carry out the selected one series of specific processing operations using the details of the individual specific processing operation in said auxiliary processing tables.

3. A form document processing apparatus according to claim 2, wherein said auxiliary processing section is operable to carry out the selected one series of specific processing operations by spreadsheet processing using the details of the individual specific processing operation in said auxiliary processing tables.

4. An apparatus for processing a variety of form documents, on each of which a plurality of entry items are recorded in a different specific form, according to the form of the individual form document, said apparatus comprising;
    a main processing section for carrying out a series of routine processing operations on input data of each of the form documents regardless of the form of each said form documents and for issuing a request to carry out a series of specific processing operations on the data of each said form documents in accordance with the form of each said form documents;
    an auxiliary processing section, responsive to said request issued by said main processing section, for selecting from various series of specific processing operations one series of specific processing operations corresponding to the form of each said form documents and for carrying out the selected one series of specific processing operations to the data of each said form documents;
    one or more auxiliary processing tables containing details of the individual specific processing operation for each of said various series; and
    an auxiliary processing table preparation unit for preparing each of said auxiliary processing tables, said auxiliary processing table preparation unit including
        a main processing definition section for storing information about a name of each said form documents and a name of at least one corresponding auxiliary processing table containing a series of specific processing operations to be carried out on each said form documents,
        a form data definition section for storing information about both the name of each said form documents and the plural entry items recorded on each said form documents, and
        an auxiliary processing table preparation section for preparing each said auxiliary processing table based on both the information stored in said main processing definition section and the information stored in said form data definition section;
    wherein said auxiliary processing section is operable to carry out the selected one series of specific processing operations using the details of the individual specific processing operation in said auxiliary processing tables.

5. A form document processing apparatus according to claim 4, further comprising an input section for inputting into said auxiliary processing table preparation unit the details of the individual specific processing operation for each said series to be carried out on the data of each said form document,
    wherein said auxiliary processing table preparation section further includes:
        means for obtaining, from said main processing definition section, information about both a name of each said form document and a name of the corresponding auxiliary processing table;
        means for retrieving, from said form data definition section, information about entry items recorded on each said form document by the name of each said form document;
        means for setting, in said corresponding auxiliary processing table, an area for the individual entry item of each said form document based on the retrieved information about the entry items of each said form document; and means for setting, in the corresponding area of said corresponding auxiliary processing table to the individual entry item of each said form document, the details of the individual specific processing operation for each said various series inputted from said input section.

6. An apparatus for processing a variety of form documents, on each of which a plurality of entry items are recorded in a different specific form, according to the form of the individual form document, said apparatus comprising:

a main processing section for carrying out a series of routine processing operations on input data of each of the form documents regardless of the form of each said form documents and for issuing a request to carry out a series of specific processing operations on the data of each said form documents in accordance with the form of each said form documents;

an auxiliary processing section, responsive to said request issued by said main processing section, for selecting from various series of specific processing operations one series of specific processing operations corresponding to the form of each said form documents and for carrying out the selected one series of specific processing operations to the data of each said form documents;

one or more auxiliary processing tables containing details of the individual specific processing operation for each of said various series; and an auxiliary processing table preparation unit for preparing each of said auxiliary processing tables, said auxiliary processing table preparation unit including a main processing definition section for storing information about a name of each said form document and a name of at least one corresponding auxiliary processing table containing a series of specific processing operations to be carried out on each said form document, wherein said main processing section includes means for extracting the name of each said form documents from the input data of each said form documents, means for selecting said at least one auxiliary processing table corresponding to each said form documents by consulting the information stored in said main processing definition section, and means for setting, in a corresponding area of each said corresponding auxiliary processing table, details of the individual specific processing operation for each said series to be carried out to the data of each said form documents.

7. A form document processing apparatus according to claim 4, wherein said main processing definition section includes a table for containing the name of each said form document and the name of the corresponding auxiliary processing table so as to correspond to one another and for containing information about a destination to which the data of each said form document is to be sent after the processing of said form document processing apparatus.

8. A form document processing apparatus according to claim 4, wherein said form data definition section including a table for containing information about entry items recorded on each said form document.

9. A method for processing variety of form documents, on each of which a plurality of entry items are recorded in a different specific form, according to the form of the individual form document by a main processing section and an auxiliary processing section, said method comprising the steps of:

in the main processing section of the form document processing apparatus,
(a) carrying out a series of routine processing operations on input image data of each of the form of each said form documents;
(b) issuing a request to carry out a series of specific processing operations on the image data of each said form documents in accordance with the form of each said form documents;

in the auxiliary processing section of the form document processing apparatus,
(c) responsive to said request issued in said step (b), selecting from various series of specific processing operations one series of specific processing operations corresponding to the form of each said form documents; and
(d) carrying out the one series of specific processing operations selected in said step (c) to the image data of each said form documents.

10. A method of processing a variety of form documents, on each of which a plurality of entry items are recorded in a different specific form, according to the form of the individual form document by a main processing section and an auxiliary processing section, said method comprising the steps of;

in the main processing section of the form document processing apparatus,
(a) carrying out a series of routine processing operations on input data of each of the form documents regardless of the form of each said form documents;
(b) issuing a request to carry out a series of specific processing operations on the data of each said form documents in accordance with the form of each said form documents;

in the auxiliary processing section of the form document processing apparatus,
(c) responsive to said request issued in said step (b), selecting from various series of specific processing operations one series of specific processing operations corresponding to the form of each said form documents; and
(d) carrying out the one series of specific processing operations selected in said step (c) to the data of each said form documents;

said method further comprising a step of preparing one or more auxiliary processing tables containing details of the individual specific processing operation for each of said various series in an auxiliary processing section, wherein the one series of specific processing operations is carried out using the details of the individual specific processing operation in said auxiliary processing tables prepared in said step (d).

11. A computer-readable recording medium for use in a computer which processes a variety of form documents, on each of which plurality of entry items are recorded in a different specific form, according to the form of the individual form document by a main processing section and an auxiliary processing section, said recording medium storing a program which give instruction to the main and auxiliary processing sections to execute the following procedures of:

for the main processing section,
(a) carrying out a series of routine processing operations on input image data of each of the form documents regardless of the form of each said form documents;

(b) issuing a request to carry out a series of specific processing operations on the image data of each said form documents in accordance with the form of each said form documents;

for the auxiliary processing section;

(c) responsive to said request issued in said procedure (b), selecting from various series of specific processing operations one series of specific processing operations corresponding to the form of each said form documents; and (d) carrying out the one series of specific processing operations selected in said procedure (c) to the image data of each said form documents.

12. A computer-readable recording medium for use in a computer which processes a variety of form documents, on each of which a plurality of entry items are recorded in a different specific form, according to the form of the individual form document by a main processing section and an auxiliary processing section, said recording medium storing a program which gives instructions to the main and auxiliary processing sections to execute the following procedures of:

for the main processing section, (a) carrying out a series of routine processing operations on input data of each of the form documents regardless of the form of each said form documents;

(b) issuing a request to carry out a series of specific processing operations on the data of each said form documents in accordance with the form of each said form documents;

for the auxiliary processing section, (c) responsive to said request issued in said procedure (b), selecting from various series of specific processing operations one series of specific processing operations corresponding to the form of each said form documents; and (d) carrying out the one series of specific processing operations selected in said procedure (c) to the data of each said form documents;

said program gives further instructions to the auxiliary processing section to execute the procedure of preparing one or more auxiliary processing tables containing details of the individual specific processing operation for each of said various series, and in said procedure (d), the selected one series of specific processing operations is carried out using the details of the individual specific processing operation in said auxiliary processing tables.

13. A computer-readable recording medium for use in a computer which processes a variety of form documents, on each of which a plurality of entry items are recorded in a different specific form, according to the form of the individual form document by a main processing section and an auxiliary processing section, said recording medium storing a program which executes the following procedures of:

(a) causing the main processing section to carry out a series of routine processing operations on input image data of each of the form documents regardless of the form of each said form documents;

(b) sending to the auxiliary processing section the image data of each said form documents;

(c) requesting the auxiliary processing section to carry out a series of specific processing operations on the image data of each said form documents sent in said procedure (b), wherein the auxiliary processing section in response to said request, selects from the series of specific processing operations, a particular series of specific processing operations which corresponds to the form of each said form documents; and (d) executing the particular series of specific operations on the image data of each said form documents.

14. A computer-readable recording medium for use in a computer which processes a variety of form documents, on each of which a plurality of entry items are recorded in a different specific form, according to the form of the individual form document by a main processing section and an auxiliary processing section, said recording medium storing a program which executes the following procedures of:

(a) performing a series of routine processing operations by the main processing section on input image data of each of the form documents regardless of the form of each said form documents;

(b) issuing a request by the main processing section to the auxiliary processing section to perform a series of specific processing operations on the image data of each said form documents in accordance with the form of each said form documents;

(c) receiving from the main processing section the image data of each said form documents; and (d) responding to the request issued by the main processing section, wherein the auxiliary processing section selects from the series of specific processing operations, a particular series of specific processing operations corresponding to the form of each said form documents; and wherein the auxiliary processing section carries out the particular series of specific processing operations on the image data of each said form documents.

* * * * *